(12) United States Patent
Bai et al.

(10) Patent No.: US 10,637,709 B2
(45) Date of Patent: Apr. 28, 2020

(54) SIGNALING METHODS FOR FREQUENCY OFFSET ESTIMATION USING REFERENCE SIGNALS

(71) Applicant: QUALCOMM Incorporated, San Diego, CA (US)

(72) Inventors: Tianyang Bai, Bridgewater, NJ (US); Juergen Cezanne, Ocean Township, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/706,183

(22) Filed: Sep. 15, 2017

(65) Prior Publication Data

US 2018/0205589 A1    Jul. 19, 2018

Related U.S. Application Data

(60) Provisional application No. 62/446,798, filed on Jan. 16, 2017.

(51) Int. Cl.
*H04L 27/26* (2006.01)
*H04L 5/00* (2006.01)
(Continued)

(52) U.S. Cl.
CPC ........ *H04L 27/2672* (2013.01); *H04L 5/0035* (2013.01); *H04L 5/0048* (2013.01);
(Continued)

(58) Field of Classification Search
CPC ............. H04L 27/2662; H04L 27/2675; H04L 25/0228; H04L 5/0048; H04L 27/2657;
(Continued)

(56) References Cited

U.S. PATENT DOCUMENTS 6,862,297 B1   3/2005  Gardner et al.
8,259,828 B2   9/2012  Fu et al.
(Continued)

FOREIGN PATENT DOCUMENTS

CN   101917363 A   12/2010
CN   103873394 B    8/2017
EP     2429090 A1   3/2012

OTHER PUBLICATIONS

International Search Report and Written Opinion—PCT/US2017/064854—ISA/EPO—dated Mar. 8, 2018.
(Continued)

*Primary Examiner* — Wutchung Chu
(74) *Attorney, Agent, or Firm* — Holland & Hart LLP

(57) ABSTRACT

Methods, systems, and devices for wireless communication are described. Reference signals may be used for estimating frequency offset at a wireless device. For example, a first wireless device may identify a frequency offset estimation request for a second wireless device. The first wireless device may in turn transmit an initialization signal to the second wireless device to estimate the frequency offset, where the initialization signal may identify parameters for the transmission of a reference signal. The reference signal may then be transmitted to the second wireless device, and the second wireless device may estimate the frequency offset. In some examples, the second wireless device may send a request for the reference signal, where the request may include proposed parameters for the transmission of the reference signal. The first wireless device may accept the proposed parameters, or provide different parameters, and transmit the reference signal.

30 Claims, 16 Drawing Sheets

(51) Int. Cl.
*H04L 25/03* (2006.01)
*H04W 56/00* (2009.01)

(52) U.S. Cl.
CPC .... *H04L 25/03159* (2013.01); *H04L 27/2613* (2013.01); *H04L 27/2646* (2013.01); *H04L 27/2657* (2013.01); *H04W 56/0035* (2013.01)

(58) Field of Classification Search
CPC ....... H04L 2027/0026; H04L 25/0202; H04W 24/10; H04W 24/02
See application file for complete search history.

(56) References Cited

U.S. PATENT DOCUMENTS

| | | | |
|---|---|---|---|
| 8,355,468 B2 | 1/2013 | Ro et al. | |
| 9,462,562 B2 | 10/2016 | Chakraborty et al. | |
| 9,622,202 B2* | 4/2017 | Kim | H04W 56/00 |
| 2004/0067741 A1* | 4/2004 | Fei | H04L 27/2657 455/192.1 |
| 2013/0121246 A1* | 5/2013 | Guey | H04W 56/001 370/328 |
| 2013/0210435 A1* | 8/2013 | Dimou | H04W 36/0085 455/436 |
| 2013/0329721 A1* | 12/2013 | Doetsch | H04L 27/0014 370/350 |
| 2014/0198747 A1* | 7/2014 | Ouchi | H04L 5/0053 370/329 |
| 2014/0198763 A1* | 7/2014 | Sorrentino | H04B 7/024 370/330 |
| 2015/0029874 A1* | 1/2015 | Davydov | H04B 7/0452 370/252 |
| 2015/0092738 A1* | 4/2015 | Chakraborty | H04W 72/0413 370/330 |
| 2015/0141018 A1* | 5/2015 | Kapoulas | H04W 36/0083 455/437 |
| 2015/0181546 A1* | 6/2015 | Freda | H04W 56/0015 370/336 |
| 2015/0200755 A1* | 7/2015 | Hammarwall | H04B 7/0626 370/329 |
| 2015/0341153 A1 | 11/2015 | Jongren et al. | |
| 2016/0020876 A1 | 1/2016 | Raghavan et al. | |
| 2016/0036571 A1* | 2/2016 | Park | H04B 7/024 370/330 |
| 2016/0050050 A1* | 2/2016 | Kang | H04B 7/0617 370/329 |
| 2016/0143055 A1* | 5/2016 | Nammi | H04W 74/006 370/329 |
| 2016/0165471 A1* | 6/2016 | Bontu | H04L 1/0026 370/241 |
| 2016/0212719 A1* | 7/2016 | Chakraborty | H04W 88/06 |
| 2016/0248561 A1* | 8/2016 | Davydov | H04B 7/024 |
| 2016/0249279 A1* | 8/2016 | Koorapaty | H04W 48/16 |
| 2016/0337157 A1* | 11/2016 | Papasakellariou | H04B 3/232 |
| 2017/0005764 A1* | 1/2017 | Park | H04J 11/005 |
| 2017/0048810 A1* | 2/2017 | Sahlin | H04L 5/0048 |
| 2017/0078066 A1* | 3/2017 | Park | H04B 7/024 |
| 2017/0094562 A1* | 3/2017 | Zander | H04J 11/00 |
| 2017/0142738 A1* | 5/2017 | You | H04L 5/001 |
| 2017/0164387 A1* | 6/2017 | Lou | H04B 7/0452 |
| 2017/0187503 A1* | 6/2017 | Seo | H04L 5/0048 |
| 2017/0208588 A1* | 7/2017 | Park | H04L 27/26 |
| 2017/0257243 A1* | 9/2017 | Sahlin | H04L 5/0048 |
| 2017/0295504 A1* | 10/2017 | Yoo | H04L 1/001 |
| 2017/0318574 A1* | 11/2017 | Choi | H04L 5/0048 |
| 2018/0014268 A1* | 1/2018 | Kuppusamy | H04L 27/266 |
| 2018/0077630 A1* | 3/2018 | Kuchi | H04W 48/16 |
| 2018/0110057 A1* | 4/2018 | Park | H04W 74/0808 |
| 2018/0183554 A1* | 6/2018 | Lim | H04L 5/005 |
| 2018/0205517 A1* | 7/2018 | Shao | H04L 27/144 |
| 2019/0036666 A1* | 1/2019 | Li | H04L 1/0031 |

OTHER PUBLICATIONS

Kim J., et al., "Distributed Antenna System-Based Millimeter-Wave Mobile Broadband Communication System for High Speed Trains", International Conference on ICT Convergence (ICTC), IEEE, Oct. 14, 2013 (Oct. 14, 2013), XP032527137, DOI: 10.1109/ICTC.2013.6675343, pp. 218-222, [retrieved on Nov. 25, 2013].

* cited by examiner

SIGNALING METHODS FOR FREQUENCY OFFSET ESTIMATION USING REFERENCE SIGNALS

CROSS REFERENCES

The present Application for Patent claims priority to U.S. Provisional Patent Application No. 62/446,798 by Bai et al., entitled "SIGNALING METHODS FOR FREQUENCY OFFSET ESTIMATION USING REFERENCE SIGNALS," filed Jan. 16, 2017, assigned to the assignee hereof, and which is hereby expressly incorporated by reference herein in its entirety.

BACKGROUND

The following relates generally to wireless communication, and more specifically to signaling methods for frequency offset estimation using reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications system, transmissions between devices (e.g., between a UE and base station) may be affected by a range of channel conditions. For instance, transmissions from a base station to a UE may be affected by carrier frequency offset, where a received signal may be shifted in frequency. In such cases, it may be desirable to implement methods by which the carrier frequency offset may be adaptively corrected to enable more efficient wireless communications.

SUMMARY

The described techniques relate to improved methods, systems, devices, or apparatuses that support signaling methods for frequency offset estimation using reference signals. Generally, the described techniques provide for use of a reference signal for estimating frequency offset at a wireless device. For example, a first wireless device (e.g., a base station or UE) may identify a frequency offset estimation request for a second wireless device. In some cases, the first wireless device may in turn transmit a signal (e.g., an initialization signal) to the second wireless device to aid in frequency offset estimation, where the signal may include an indication of parameters for the transmission of a reference signal. Additionally or alternatively, the second wireless device may identify the indication of parameters from higher layer signaling. The reference signal may then be transmitted to the second wireless device according to the indicated parameters (or other parameters), and the second wireless device may estimate the frequency offset. In some examples, the second wireless device may send a request to have a reference signal sent for frequency offset estimation, where the request may include proposed parameters for the transmission of the reference signal. The first wireless device may accept the proposed parameters, or provide different parameters, and accordingly transmit the reference signal.

A method of wireless communication is described. The method may include identifying a frequency offset estimation request for a wireless device in a system that supports millimeter wave (mmW) communications, transmitting, to the wireless device, a first signal identifying parameters for a reference signal to be transmitted for a frequency offset estimation, transmitting the reference signal based at least in part on the identified parameters, and receiving, from the wireless device, a second signal comprising a frequency offset estimate sent in response to the transmitted reference signal.

An apparatus for wireless communication is described. The apparatus may include means for identifying a frequency offset estimation request for a wireless device in a system that supports mmW communications, means for transmitting, to the wireless device, a first signal identifying parameters for a reference signal to be transmitted for a frequency offset estimation, means for transmitting the reference signal based at least in part on the identified parameters, and means for receiving, from the wireless device, a second signal comprising a frequency offset estimate sent in response to the transmitted reference signal.

Another apparatus for wireless communication is described. The apparatus may include a processor, memory in electronic communication with the processor, and instructions stored in the memory. The instructions may be operable to cause the processor to identify a frequency offset estimation request for a wireless device in a system that supports mmW communications, transmit, to the wireless device, a first signal identifying parameters for a reference signal to be transmitted for a frequency offset estimation, transmit the reference signal based at least in part on the identified parameters, and receive, from the wireless device, a second signal comprising a frequency offset estimate sent in response to the transmitted reference signal.

A non-transitory computer readable medium for wireless communication is described. The non-transitory computer-readable medium may include instructions operable to cause a processor to identify a frequency offset estimation request for a wireless device in a system that supports mmW communications, transmit, to the wireless device, a first signal identifying parameters for a reference signal to be transmitted for a frequency offset estimation, transmit the reference signal based at least in part on the identified parameters, and receive, from the wireless device, a second signal comprising a frequency offset estimate sent in response to the transmitted reference signal.

Some examples of the method, apparatus, and non-transitory computer-readable medium described above may further include processes, features, means, or instructions for transmitting the first signal comprises transmitting an initialization signal including the frequency offset estimation request. In some examples of the method, apparatus, and non-transitory computer-readable medium described above, the identified parameters comprise a frequency domain pattern, a time domain pattern, one or more port numbers, a transmission time, a feedback scheme for the frequency offset estimate, or a combination thereof.

Some examples of the method, apparatus, and non-transitory computer-readable medium described above may further include processes, features, means, or instructions for identifying the frequency offset estimation request comprises receiving a request from the wireless device. In some examples of the method, apparatus, and non-transitory computer-readable medium described above, the request from the wireless device comprises an indication of at least one proposed parameter, the at least one proposed parameter comprising a proposed frequency domain pattern, a proposed time domain pattern, one or more proposed port numbers, a proposed transmission time, a proposed feedback scheme for the frequency offset estimate, or a combination thereof.

In some examples of the method, apparatus, and non-transitory computer-readable medium described above may further include processes, features, means, or instructions for transmitting an indication of approval of the proposed parameters.

Some examples of the method, apparatus, and non-transitory computer-readable medium described above may further include processes, features, means, or instructions for transmitting a first signal, the first signal identifying the parameters for the reference signal, wherein the first signal comprises an indication of an alternative reference signal parameter including an alternative frequency domain pattern, an alternative time domain pattern, one or more alternative port numbers, an alternative transmission time, an alternative feedback scheme for the frequency offset estimate, or a combination thereof.

In some examples of the method, apparatus, and non-transitory computer-readable medium described above, the transmitting the reference signal comprises transmitting the reference signal at a predefined time or during a predefined transmission time interval (TTI).

Some examples of the method, apparatus, and non-transitory computer-readable medium described above may further include processes, features, means, or instructions for identifying a Doppler shift associated with the wireless device, or a carrier frequency offset between a transmitted signal and a received signal, or both, wherein the frequency offset estimate may be based at least in part on the identified Doppler shift, or the identified carrier frequency offset between the transmitted signal and the received signal, or both.

Some examples of the method, apparatus, and non-transitory computer-readable medium described above may further include processes, features, means, or instructions for transmitting a signal using an adjusted frequency based at least in part on the frequency offset estimate.

Some examples of the method, apparatus, and non-transitory computer-readable medium described above may further include processes, features, means, or instructions for transmitting a signal using an adjusted frequency based at least in part on a recommended frequency adjustment.

Some examples of the method, apparatus, and non-transitory computer-readable medium described above may further include processes, features, means, or instructions for transmitting a signal using an adjusted frequency based at least in part on the recommended frequency adjustment. In some examples of the method, apparatus, and non-transitory computer-readable medium described above, the first signal identifying the parameters for the reference signal may be transmitted using downlink control information (DCI) or using radio resource control (RRC) signaling.

Some examples of the method, apparatus, and non-transitory computer-readable medium described above may further include processes, features, means, or instructions for transmitting a first signal, the first signal identifying the parameters for the reference signal, wherein the first signal may be transmitted using a channel state information reference signal (CSI-RS) report, a control channel, a data channel, a sounding reference signal (SRS), or a combination thereof. In the example of using an SRS, information associated with the first signal may be indicated the measurement results as may be enabled by the SRS.

In some examples of the method, apparatus, and non-transitory computer-readable medium described above, the reference signal comprises a phase tracking reference signal (PT-RS), a mobility reference signal (MRS), an SRS, or a combination thereof.

In some examples of the method, apparatus, and non-transitory computer-readable medium described above, the frequency offset estimation request may be identified based at least in part on higher layer signaling.

In some examples of the method, apparatus, and non-transitory computer-readable medium described above, the wireless device comprises a UE. In some examples of the method, apparatus, and non-transitory computer-readable medium described above, the wireless device comprises a base station.

A method of wireless communication is described. The method may include receiving, from a wireless device in a system that supports mmW communications, a first signal identifying parameters for a reference signal to be received for a frequency offset estimation. The method may include receiving, from a wireless device in a system that supports mmW communications, the reference signal based at least in part on the identified parameters, and transmitting, to the wireless device, a second signal comprising a frequency offset estimate sent in response to the transmitted reference signal.

An apparatus for wireless communication is described. The apparatus may include means for receiving, from a wireless device in a system that supports mmW communications, a first signal identifying parameters for a reference signal to be received for a frequency offset estimation. The apparatus may include means for receiving, from a wireless device in a system that supports mmW communications, the reference signal based at least in part on the identified parameters, and means for transmitting, to the wireless device, a second signal comprising a frequency offset estimate sent in response to the transmitted reference signal.

Another apparatus for wireless communication is described. The apparatus may include a processor, memory in electronic communication with the processor, and instructions stored in the memory. The instructions may be operable to cause the processor to receive, from a wireless device in a system that supports mmW communications, a first signal identifying parameters for a reference signal to be received for a frequency offset estimation. The apparatus may receive, from a wireless device in a system that supports mmW communications, the reference signal based at least in part on the identified parameters, and transmit, to the wireless device, a second signal comprising a frequency offset estimate sent in response to the transmitted reference signal.

A non-transitory computer readable medium for wireless communication is described. The non-transitory computer-readable medium may include instructions operable to cause a processor to receive, from a wireless device in a system that supports mmW communications, a first signal identifying parameters for a reference signal to be received for a frequency offset estimation. The non-transitory computer-readable medium may receive, from a wireless device in a system that supports mmW communications, the reference signal based at least in part on the identified parameters, and transmit, to the wireless device, a second signal comprising a frequency offset estimate sent in response to the transmitted reference signal.

Some examples of the method, apparatus, and non-transitory computer-readable medium described above may further include processes, features, means, or instructions for transmitting, to the wireless device, a request to send the reference signal. Some examples of the method, apparatus, and non-transitory computer-readable medium described above may further include processes, features, means, or instructions for receiving a first signal based at least in part on the transmitted request, wherein identifying the parameters for the reference signal may be based at least in part on the first signal.

In some examples of the method, apparatus, and non-transitory computer-readable medium described above, the request to send the reference signal comprises an indication of at least one proposed parameter, the at least one proposed parameter comprising a proposed frequency domain pattern, a proposed time domain pattern, one or more proposed port numbers, a proposed transmission time, a proposed feedback scheme for the frequency offset estimate, or a combination thereof.

Some examples of the method, apparatus, and non-transitory computer-readable medium described above may further include processes, features, means, or instructions for identifying a Doppler shift associated with the wireless device, or a carrier frequency offset between a transmitted signal and a received signal, or both, wherein the frequency offset estimate may be based at least in part on the identified Doppler shift, or the identified carrier frequency offset between the transmitted signal and the received signal, or both.

Some examples of the method, apparatus, and non-transitory computer-readable medium described above may further include processes, features, means, or instructions for transmitting a signal using an adjusted frequency based at least in part on the frequency offset estimate.

Some examples of the method, apparatus, and non-transitory computer-readable medium described above may further include processes, features, means, or instructions for transmitting a signal indicating a recommended frequency adjustment based at least in part on the frequency offset estimate. In some examples of the method, apparatus, and non-transitory computer-readable medium described above, the receiving the reference signal comprises receiving the reference signal at a predefined time or during a predefined TTI. In some examples of the method, apparatus, and non-transitory computer-readable medium described above, the first signal may be received using DCI or using RRC signaling.

In some examples of the method, apparatus, and non-transitory computer-readable medium described above, the first signal may be received using a CSI-RS report, a control channel, a data channel, an SRS, or a combination thereof. In some examples of the method, apparatus, and non-transitory computer-readable medium described above, the reference signal comprises a PT-RS, an MRS, a sounding reference signal, or a combination thereof.

Some examples of the method, apparatus, and non-transitory computer-readable medium described above may further include processes, features, means, or instructions for receiving a first signal, the first signal identifying the parameters for the reference signal, wherein the first signal may be received using DCI or using RRC signaling.

Some examples of the method, apparatus, and non-transitory computer-readable medium described above may further include processes, features, means, or instructions for transmitting a first signal, the first signal identifying the parameters for the reference signal, wherein the first signal may be received using a CSI-RS report, a control channel, a data channel, a SRS, or a combination thereof.

In some examples of the method, apparatus, and non-transitory computer-readable medium described above, the reference signal comprises a PT-RS, a MRS, a SRS, or a combination thereof.

Some examples of the method, apparatus, and non-transitory computer-readable medium described above may further include processes, features, means, or instructions for identifying a frequency offset estimation request based at least in part on higher layer signaling.

DETAILED DESCRIPTION

Figure 1:
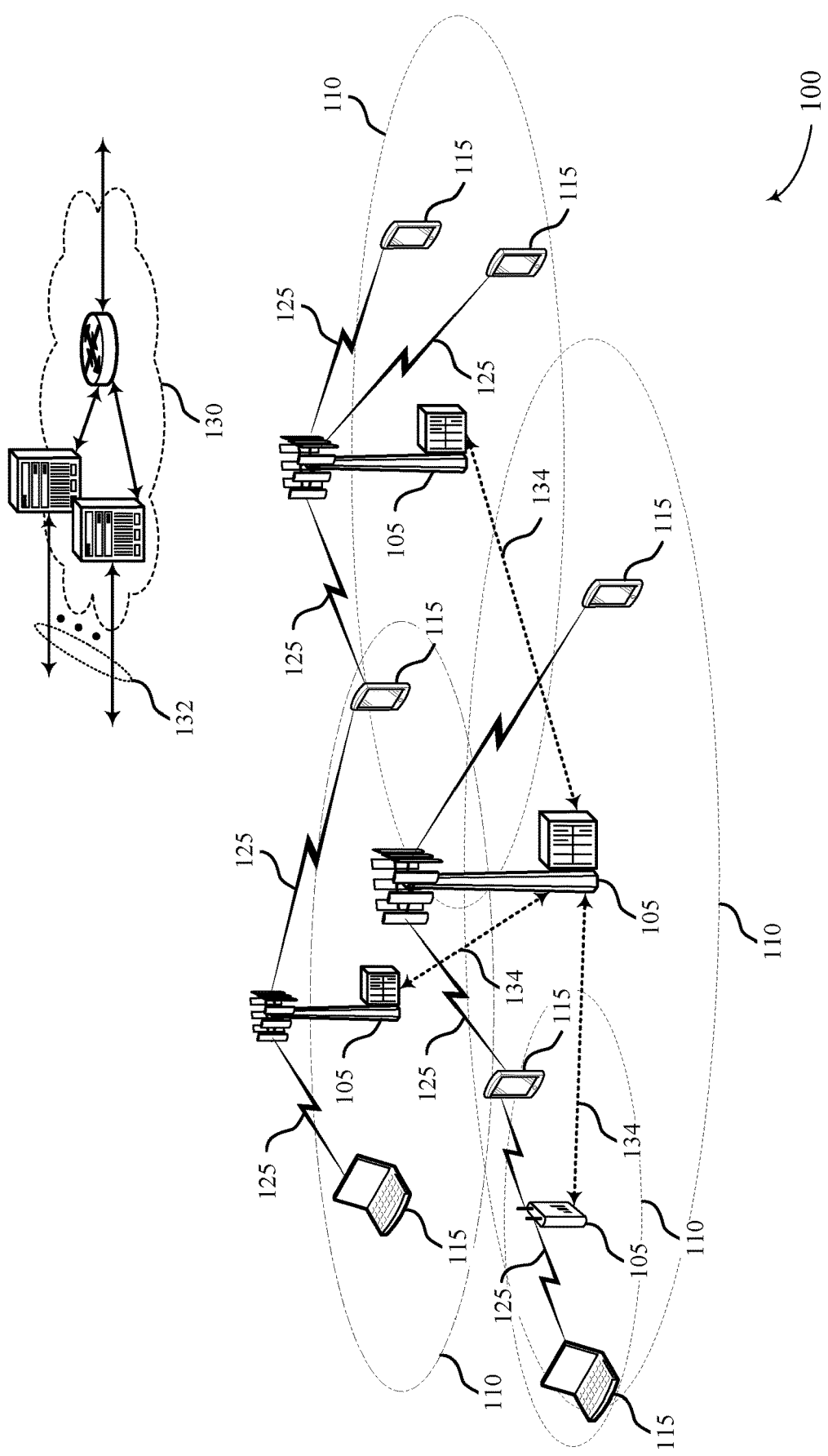
FIG. 1 illustrates an example of a wireless communications system that supports signaling methods for frequency offset estimation using reference signals in accordance with aspects of the present disclosure.

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. Some wireless communications systems operating in mmW frequency ranges may use various reference signals to track the range of channel conditions associated with the communications between base stations and user equipments (UEs). For example, a phase tracking reference signal (PT- RS) may be used to track phase variation (caused by, e.g., phase noise) over time in a mmW system. In some examples, reference signals, such as the PT-RS, may also be used to estimate a carrier frequency offset for transmitted signals in such systems. However, some reference signals may not be consistently transmitted, and as a result, wireless devices may implement signaling methods for the on-demand transmission of reference signals to facilitate frequency offset estimation to improve communications efficiency.

In some cases, frequency offset estimation processes using reference signals (such as a PT-RS, a mobility reference signal (MRS), a sounding reference signal (SRS), or other reference signals that may be used for frequency offset estimation) may be implemented at different wireless devices. For example, a wireless device, such as a base station, may transmit a signal (e.g., an initialization signal) to another wireless device, such as a UE (or vice versa). The signal may contain configuration information or parameters that include a frequency domain pattern, a time domain pattern, one or more port numbers, a transmission time for the reference signal, and a feedback scheme for frequency offset estimation. Additionally or alternatively, the configuration information and parameters may be identified by the second wireless device based on higher layer signaling between devices. Additionally, the initialization signal may initiate a coherent frequency offset estimation process by the wireless devices.

Based on the information, for example, as indicated in the signal, the base station may then transmit the reference signal. After receiving the reference signal, the UE may estimate a frequency offset based on the reference signal. Using the estimated frequency offset, the UE may correct the frequency at which its oscillators operate to account for the estimated frequency offset. Additionally or alternatively, the UE may feedback the frequency offset estimate to the base station, which may additionally or alternatively correct the frequency.

In some examples, estimating a frequency offset using a reference signal may begin by transmitting a request from the UE or base station to the other wireless device. For example, the base station or UE may transmit, to the other wireless device, a request indicating that a reference signal be transmitted for frequency offset estimation. The request may further indicate a proposed configuration or parameters that include a frequency domain pattern, time domain pattern, port number for the reference signal, transmission time for the reference signal, and/or feedback method for frequency offset estimation. Additionally or alternatively, the configuration and parameters may be identified based on higher layer signaling from other devices. After, for example, receiving the request, the UE or base station may reply with a signal that indicates whether the request is approved, or whether an alternative configuration may be used in place of the recommended configuration. Based on the transmitted and received request and subsequent signal, the base station and/or UE may then estimate and correct (or, feedback) the frequency offset.

Aspects of the disclosure are initially described in the context of a wireless communications system. Further examples illustrate parameters for the transmission of reference signals, and process flows for the initialization of frequency offset estimation. Aspects of the disclosure are further illustrated by and described with reference to apparatus diagrams, system diagrams, and flowcharts that relate to signaling methods for frequency offset estimation using reference signals.

FIG. 1 illustrates an example of a wireless communications system 100 that supports signaling methods for frequency offset estimation using reference signals in accordance with aspects of the present disclosure. Wireless communications system 100 includes base stations 105, UEs 115, and a core network 130. In some examples, the wireless communications system 100 may be a LTE (or LTE-Advanced (LTE-A)) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 illustrates an example of a system that supports the on-demand transmission of reference signals used for the correction of carrier frequency offset.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

A base station 105 may insert periodic pilot symbols such as a cell-specific reference signal (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, a demodulation reference signal (DMRS) may be directed toward specific UEs 115 and may be transmitted only on resource blocks assigned to those UEs 115. DMRS may include signals on 6 resource elements in each resource block in which they are transmitted.

The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as a channel state information (CSI) reference signal (CSI-RS) may be included to aid in generating CSI. On the uplink, a UE 115 may transmit a combination of periodic SRS and uplink DMRS for link adaptation and demodulation, respectively. In some cases, other reference signals may be used to track changes in channel conditions, or for tracking the mobility of various devices in wireless communications system 100. For instance, a PT-RS may be transmitted to track phase changes in time to identify variations in phase noise. Additionally, an MRS may be used by a movable wireless device to identify candidate beams for use in communications.

Wireless communications system 100 may enable the use reference signal transmissions for estimating frequency offset at a wireless device. As described in the present disclosure, a wireless device may include a UE, or a base station, or other devices. For example, a first wireless device (e.g., a base station 105, UE 115) may identify a frequency offset estimation request for a second wireless device (e.g., a UE 115, a base station 105). The first wireless device may in turn transmit an initialization signal to the second wireless device to estimate the frequency offset, where the initialization signal may include an indication of parameters for the transmission of a reference signal. The reference signal may then be transmitted to the second wireless device according to the indicated parameters, and the second wireless device may estimate the frequency offset to be used to correct its own frequency offset, or to be transmitted back to the first wireless device. In some examples, the second wireless device may send a request to have a reference signal sent for frequency offset estimation, where the request may include proposed parameters for the transmission of the reference signal. The first wireless device may accept the proposed parameters, or provide different parameters, and accordingly transmit the reference signal.

Figure 2:
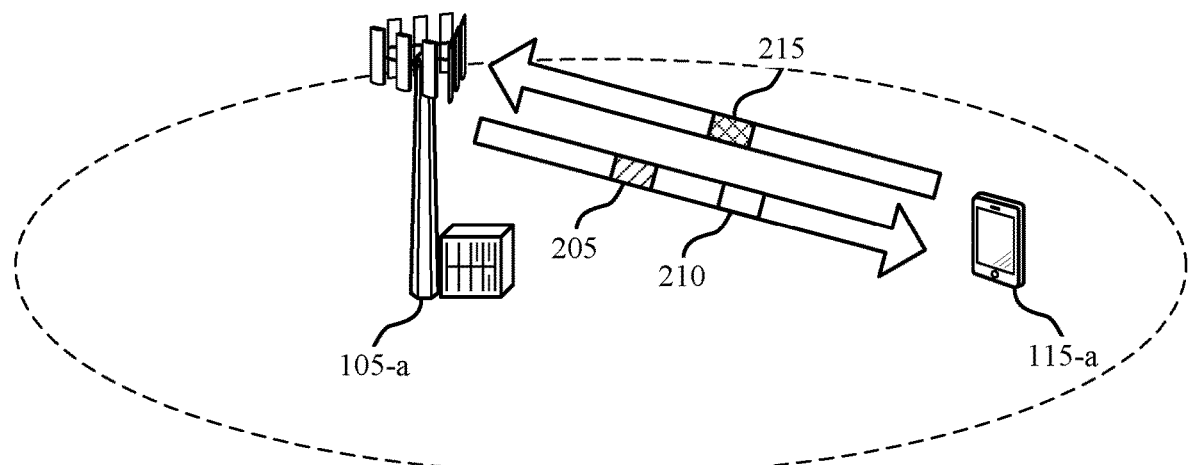
FIG. 2 illustrates an example of a wireless communications system that supports signaling methods for frequency offset estimation using reference signals in accordance with aspects of the present disclosure.

FIG. 2 illustrates an example of a wireless communications system 200 that supports signaling methods for frequency offset estimation using reference signals in accordance with aspects of the present disclosure. Wireless communications system 200 includes a base station 105-a and UE 115-a that may be examples of the corresponding devices as described with reference to FIG. 1. Wireless communications system 200 may also be an example of a system that supports mmW communications. Wireless communications system 200 may utilize dynamic signaling methods for transmitting or receiving a reference signal 205 to track and account for a frequency offset between transmitted and received transmissions between UE 115-a and base station 105-a. In the below examples, a particular operation may be described with reference to a UE 115 or a base station 105, but it should be understood that the operation may also be performed by either a UE 115 or a base station 105.

In wireless communications system 200, a reference signal (e.g., a PT-RS) may be used to track phase variation in wireless transmissions over time. Phase variation may be caused by, for example, phase noise. In some examples, reference signals such as the PT-RS may further be used to estimate the frequency offset in a system. Carrier frequency offset may be a result of such a frequency offset between a transmitter's oscillator and a receiver's oscillator, or Doppler shift (such as when a receiver is moving with respect to the transmitter, or vice versa).

However, in some cases, a PT-RS may not be transmitted by base station 105-a to correct common phase error of the phase noise due to UE 115-a operating according to a relatively lower modulation and coding scheme (MCS). Additionally, the PT-RS may not be transmitted by base station 105-a on every antenna port. For example, to correct the common phase error of the phase noise, the PT-RS may be transmitted in one of multiple ports sharing the same phase noise, but the different ports may have different frequency offsets due to different beam orientations or different Doppler shifts.

In some cases, UE 115-a may have a relatively low or medium signal-to-noise ratio (SNR), and PT-RS may not be transmitted continuously in time (e.g., PT-RS may be transmitted only every other or every four orthogonal frequency division multiplexed (OFDM) symbols) to track phase noise. In some cases, however, frequency estimation by UE 115-a may be facilitated by a more frequent transmission of reference signals such as PT-RS. On the other hand, maintaining PT-RS in an always-on state for frequency estimation may increase overhead for UE 115-a (e.g., a UE 115 having a relatively lower SNR). Thus, a signaling method may be used to initialize frequency offset estimation with a reference signal 205 (e.g., a PT-RS, MRS, SRS, or other reference signals that facilitate frequency offset estimation) when frequency offset correction is requested or determined to be needed, rather than only as regularly transmitted to track phase noise.

Reference signal 205 may be dynamically transmitted based on a detected carrier frequency offset or Doppler shift. For example, reference signal 205 may be transmitted based on a frequency offset or Doppler shift being detected at a wireless device, when reference signal 205 may not have been transmitted otherwise (such as for tracking phase noise with a PT-RS). Thus, a PT-RS may be transmitted relatively more frequently to estimate frequency offset than it may be transmitted if PT-RS were being used to track phase noise without estimating frequency offset.

A first technique for estimating a frequency offset using reference signal 205 may begin by transmitting initialization signal 210 from base station 105-a to UE 115-a (or vice versa). Initialization signal 210 may contain configuration information that may include a frequency domain pattern, PT-RS time domain pattern, port number for reference signal 205, a transmission time for reference signal 205, and feedback method for frequency offset estimation. Additionally or alternatively, UE 115-a may identify the configuration information based on higher layer signaling between devices. In such cases using higher layer signaling, the other device (i.e., base station 105-a) may not transmit the initialization signal.

In some cases, base station 105-a may first transmit initialization signal 210 to UE 115-a to begin the procedure to estimate a frequency offset. Base station 105-a may send initialization signal 210, for example, to identify and correct for Doppler shift if base station 105-a detects that UE 115-a is in a mobile state. Base station 105-a may transmit initialization signal 210 via downlink control information (DCI), in which case the DCI may include additional fields to indicate reference signal 205 and corresponding resources for reference signal 205, or via radio resource control (RRC) signaling.

Alternatively, the operations of base station 105-a may be performed by UE 115-a, and UE 115-a may transmit an initialization signal 210 to base station 105-a signaling to base station 105-a to begin the procedure to estimate the frequency offset. UE 115-a may send initialization signal 210, for example, after joining a communication session with base station 105-a to eliminate or reduce an existing frequency offset, and to correct Doppler shift if UE 115-a is in a mobile state. UE 115-a may transmit initialization signal 210, for example, via a CSI-RS report, RRC signaling, a SRS, or through other signaling.

Initialization signal 210 may indicate that base station 105-*a* will be transmitting reference signal 205 to UE 115-*a* to correct the frequency at which a downlink or uplink oscillator of UE 115-*a* operates. In such cases, the uplink and downlink oscillators of UE 115-*a* may, for example, be adjusted independently of each other, as the oscillators may use different beams, and may thus have differing Doppler shifts. Based on the information indicated in initialization signal 210 either sent to or received from UE 115-*a*, base station 105-*a* may then transmit reference signal 205 to UE 115-*a* at a certain time as may be predefined in a procedure established for frequency offset estimation (e.g., in a TTI or slot following initialization signal 210). Base station 105-*a* may alternatively transmit reference signal 205 at a certain time as may have been indicated in the transmitted initialization signal 210.

After receiving reference signal 205, UE 115-*a* may estimate a frequency offset by comparing the frequency at which reference signal 205 was transmitted by base station 105-*a* with the actual frequency at which reference signal 205 was received. The frequencies may differ, for example, due to Doppler shift. Based on the estimated frequency offset, UE 115-*a* may correct the frequency at which its downlink oscillator operates to account for the estimated frequency offset. Additionally or alternatively, UE 115-*a* may feedback the frequency offset estimate to base station 105-*a*, as may have been specified in initialization signal 210.

In some cases, UE 115-*a* may transmit a request 215 to base station 105-*a* to ask that the reference signal 205 be sent to UE 115-*a*. For instance, UE 115-*a* may initialize the frequency offset estimation process by sending request 215. Request 215 may include a number of proposed or recommended parameters for the transmission of reference signal 205 by base station 105-*a*. The request may include a proposed frequency domain pattern, a time domain pattern, one or more port numbers, a transmission time, a feedback scheme for the frequency offset estimate, or a combination of these proposed parameter. Base station 105-*a* may, in response to request 215, send signaling to UE 115-*a* that request 215 is approved (e.g., including the proposed parameters) and proceed to transmit reference signal 205 based on the parameters. Alternatively, base station 105-*a* may indicate to UE 115-*a* an additional set of parameters that it will use to transmit reference signal 205.

Figure 3:
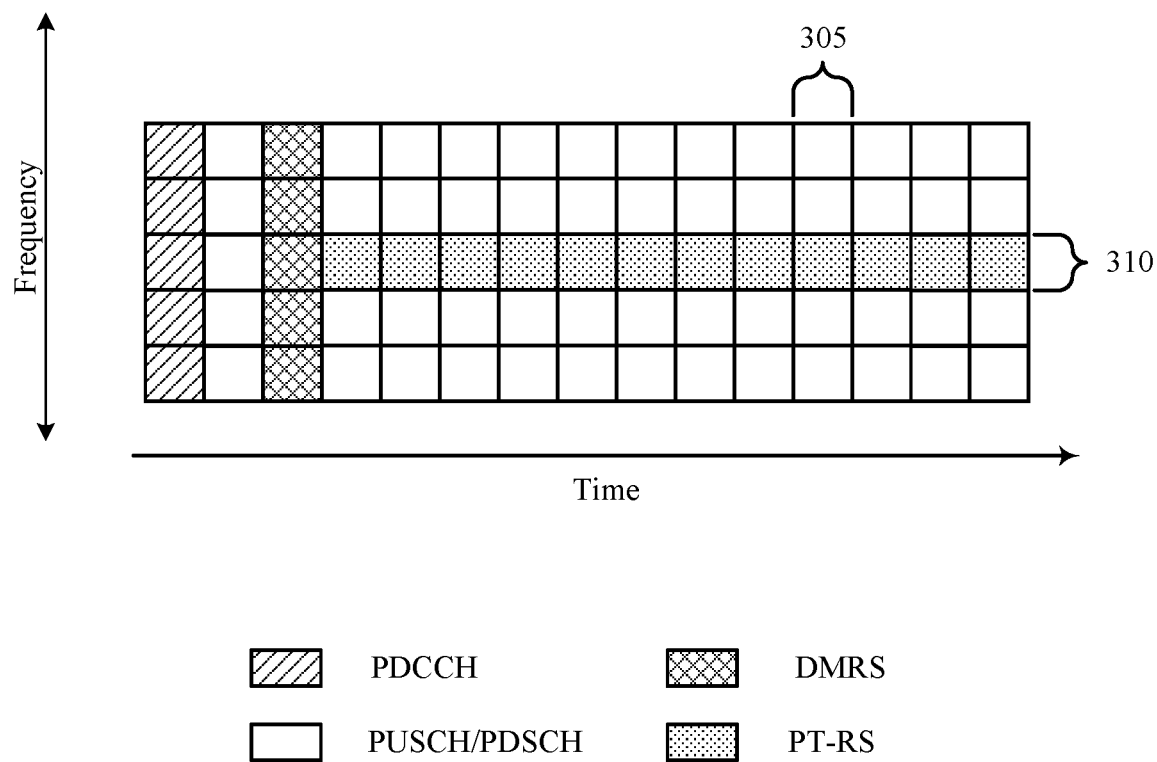
FIG. 3 illustrates an example of a reference signal configuration in a system that supports signaling methods for frequency offset estimation using reference signals in accordance with aspects of the present disclosure.

FIG. 3 illustrates an example of reference signal configuration 300 in a system that supports signaling methods for frequency offset estimation using reference signals in accordance with aspects of the present disclosure. The reference signal configuration 300 may be an example a configuration according to parameters for a reference signal between, for example, a UE 115 and base station 105, or vice versa, for estimating a frequency offset.

As described above, an initialization signal or a request for a reference signal may include at least one parameter for the transmission of a reference signal. For instance, an initialization signal (such as initialization signal 210 as described with reference to FIG. 2) may include a frequency domain pattern, a time domain pattern, one or more port numbers, a transmission time, a feedback scheme for the frequency offset estimate, or a combination these parameters. Accordingly, reference signal configuration 300 may include a set of resources (e.g., resource elements) transmitted over a number of symbols 305 (e.g., OFDM symbols), where a reference signal (e.g., a PT-RS) may be transmitted on a radio frequency band 310. For example, the reference signal may be transmitted on the radio frequency band 310 using a time domain pattern (e.g., during a set of symbols 305) or a frequency domain pattern. In other cases, the reference signal may be transmitted at a particular time or during a designated TTI. Based on the indicated parameters provided in an initialization signal, a request, or alternative parameters provided in a response to the request, reference signal configuration 300 may reflect different mappings of the reference signal to resources used to transmit the reference signal.

Figure 4:
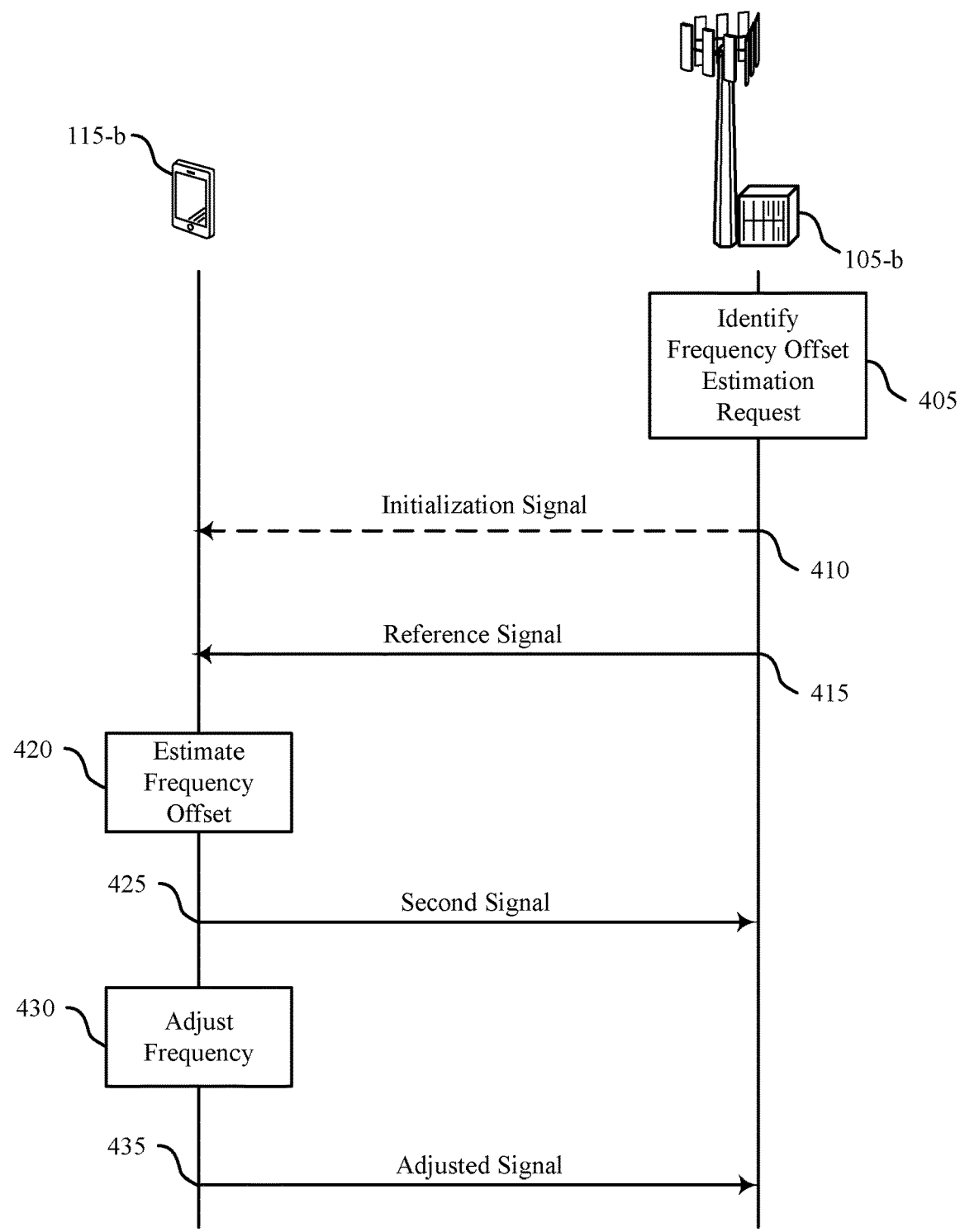
FIGS. 4 and 5 illustrate examples of process flows in systems that supports signaling methods for frequency offset estimation using reference signals in accordance with aspects of the present disclosure.

FIG. 4 illustrates an example of a process flow 400 in a system that supports signaling methods for frequency offset estimation using reference signals in accordance with aspects of the present disclosure. Process flow 400 includes a UE 115-*b* and base station 105-*b*, which may be respective examples of a UE 115 and a base station 105 as described with reference to FIGS. 1 and 2. Process flow 400 may be an example of the initialization and subsequent transmission of a reference signal for frequency offset estimation. The operations in process flow 400 performed by UE 115-*b* and base station 105-*b* may be respectively performed by either a UE 115 or a base station 105, and the example shown should not be construed as limiting. In alternative examples, the operations shown as performed by UE 115-*b* may be performed by a base station 105, and the operations shown as performed by base station 105-*b* may be performed by a UE 115.

At 405, base station 105-*b* may identify a frequency offset estimation request. The frequency offset estimation request may be based on having identified a Doppler shift associated with transmissions to or from UE 115-*b*. For example, this may be because UE 115-*b* is in a mobile state with reference to base station 105-*b*. Additionally or alternatively, the frequency offset estimation request may be based on having identified a frequency offset between a transmitted signal and a received signal, or both (e.g., an offset between oscillators at UE 115-*b* and base station 105-*b*).

At 410, base station 105-*b* may transmit, and UE 115-*b* may receive, an initialization signal (i.e., a first signal) including the frequency offset estimation request. The initialization signal may identify parameters for a reference signal to be transmitted for a frequency offset estimation. The identified parameters may include, for example, a resource allocation, a frequency domain pattern, a time domain pattern (e.g., a PT-RS time domain pattern), a port number for the reference signal (e.g., a port number for a PT-RS), and a feedback scheme (e.g., a feedback method) for the frequency offset estimation. The initialization signal may be transmitted using DCI or RRC signaling. Additionally or alternatively, in cases where UE 115-*b* is transmitting the initialization signal (not shown), the signal may be transmitted using a CSI-RS report, an SRS, or a data channel. Additionally or alternatively, in place of, or in addition to the transmitted initialization signal, UE 115-*b* may identify the parameters for the reference signal based on higher layer signaling.

At 415, base station 105-*b* may transmit, and UE 115-*b* may receive, a reference signal (e.g., a PT-RS), based on the identified parameters. UE 115-*b* may transmit the reference signal at a predefined time, or during a predefined TTI. In some examples, the reference signal comprises a PT-RS, an MRS, an SRS, another reference signal that is used for frequency offset estimation, or a combination thereof.

At 420, UE 115-*b* may estimate a frequency offset based on the received reference signal. UE 115-*b* may estimate the frequency offset by comparing the frequency at which the reference signal was transmitted by base station 105-*b* with the actual frequency at which the reference signal was received. The frequencies may differ, for example, due to Doppler shift, or a frequency offset between a transmitter's oscillator and a receiver's oscillator.

At 425, UE 115-*b* may transmit a second signal including the frequency offset estimate in response to the reference signal from base station 105-*b*. In some examples, at 430, UE 115-*b* may adjust a frequency of an oscillator (i.e., correct the frequency offset for an uplink or downlink oscillator) based on the frequency estimate. At 435, UE 115-*b* may transmit to base station 105-*b*, and base station 105-*b* may receive from UE 115-*b*, an adjusted signal. The adjusted signal may be transmitted using the adjusted frequency based on the frequency offset estimate.

Figure 5:
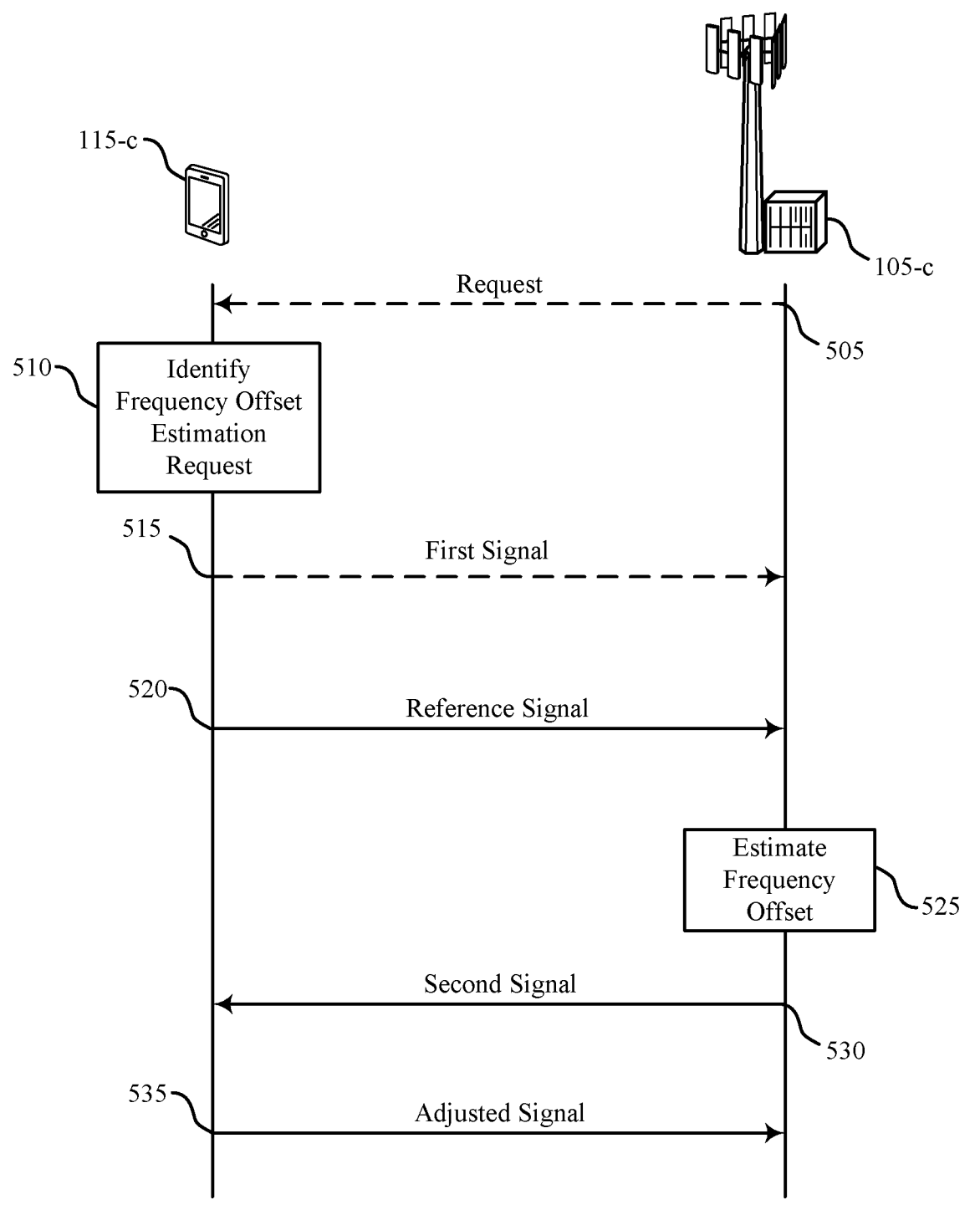

FIG. 5 illustrates an example of a process flow 500 in a system that supports signaling methods for frequency offset estimation using reference signals in accordance with aspects of the present disclosure. Process flow 500 includes a UE 115-*c* and base station 105-*c*, which may be respective examples of a UE 115 and a base station 105 as described with reference to FIGS. 1 and 2. Process flow 500 may be an example of initializing a frequency offset estimation process through a request for a reference signal. The operations in process flow 500 performed by UE 115-*c* and base station 105-*c* may be respectively performed by either a UE 115 or a base station 105, and the example shown should not be construed as limiting. In alternative examples, the operations shown as performed by UE 115-*c* may be performed by a base station 105, and the operations shown as performed by base station 105-*c* may be performed by a UE 115.

At 505, base station 105-*c* may transmit to UE 115-*c*, and UE 115-*c* may receive from base station 105-*c*, a request. The request may include an indication proposed parameters, including, for example, a proposed resource allocation, a proposed frequency domain pattern, a proposed time domain pattern (e.g., a proposed PT-RS time domain pattern), a proposed port number for the reference signal (e.g., a proposed port number for a PT-RS), and a proposed feedback scheme (e.g., a feedback method) for the frequency offset estimation. The request may be based on having identified a Doppler shift associated with transmissions to or from UE 115-*c*. This may be because UE 115-*c* is determined to be in a mobile state with reference to a receiving device. Additionally or alternatively, the request may be based on having identified a frequency offset between a transmitted signal and a received signal, or both.

At 510, UE 115-*c* may identify a frequency offset estimation request. The frequency offset estimation request may be based on the request received from the base station 105-*c* at 505. At 515, UE 115-*c* may transmit to base station 105-*c*, and base station 105-*c* may receive from UE 115-*c*, a first signal indicating either an indication of approval of the proposed parameters received in the request at 505, or an indication of one or more alternative reference signal parameters. The first signal may acknowledge parameters for the transmission of a reference signal to the base station 105-*c* that are in accordance with the received proposed parameters in the case of an indication of approval. Additionally or alternatively, either or both devices of UE 115-*c* and base station 105-*c* may identify the parameters for the reference signal based on higher layer signaling.

Alternatively, the indication signal may identify parameters to the base station 105-*c* in which one or more of the parameters differ from the received parameters, in the case of an indication of one or more alternative reference signal parameters. The identified parameters may include, for example, a resource allocation, a frequency domain pattern, a time domain pattern (e.g., a PT-RS time domain pattern), a port number for the reference signal (e.g., a port number for a PT-RS), and a feedback scheme (e.g., a feedback method) for the frequency offset estimation. The indication signal may be transmitted using DCI, RRC signaling, a CSI-RS report, a SRS, or a data channel.

At 520, UE 115-*c* may transmit to base station 105-*c*, and base station 105-*c* may receive from UE 115-*c*, a reference signal (e.g., a PT-RS), based on the identified parameters. UE 115-*c* may transmit the reference signal at a predefined time, or during a predefined TTI. At 525, base station 105-*c* may estimate a frequency offset based on the received reference signal. Base station 105-*c* may estimate the frequency offset by comparing the frequency at which the PT-RS was transmitted by UE 115-*c* with the actual frequency at which the PT-RS was received. The frequencies may differ, for example, due to Doppler shift, or a frequency offset between a transmitter's oscillator and a receiver's oscillator.

At 530, base station 105-*c* may transmit to UE 115-*c*, and UE 115-*c* may receive from base station 105-*c*, a second signal including the frequency offset estimate sent in response to the transmitted reference signal. In some cases, the second signal may include a recommended frequency offset adjustment based on the frequency offset estimate. This may be a feedback message according to the identified feedback scheme.

At 535, UE 115-*c* may transmit to base station 105-*c*, and base station 105-*c* may receive from UE 115-*c*, an adjusted signal. For example, based on the feedback received from base station 105-*c*, UE 115-*c* may correct for the frequency offset, and adjust an oscillator to an updated frequency. The adjusted signal may be transmitted using an adjusted frequency based on the frequency offset estimate, as may have been indicated in the recommended frequency offset adjustment.

Figure 6:
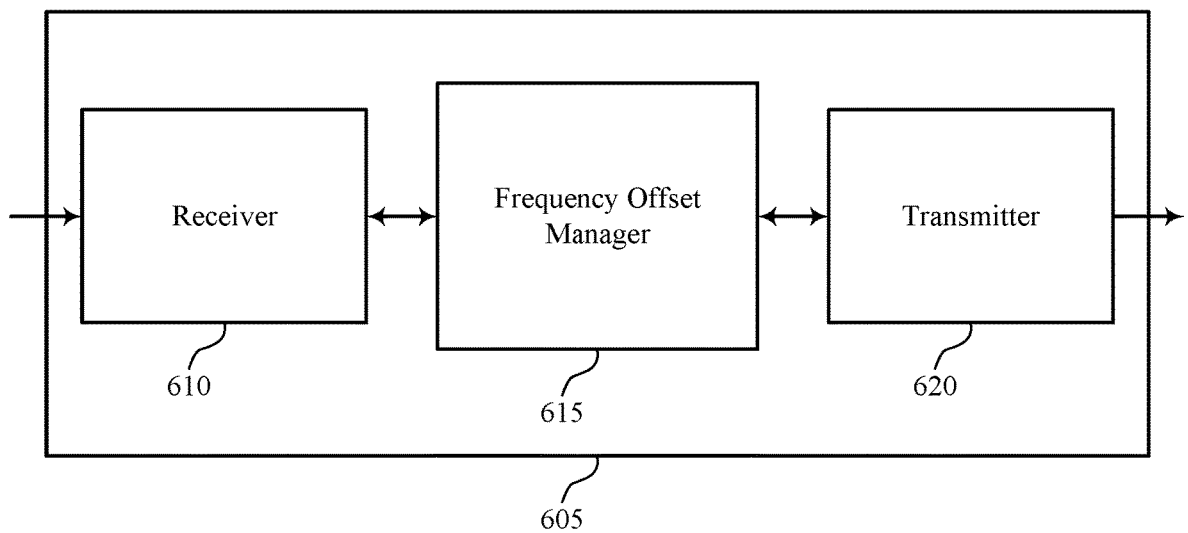
FIGS. 6 and 7 show block diagrams of wireless devices that support signaling methods for frequency offset estimation using reference signals in accordance with aspects of the present disclosure.

FIG. 6 shows a block diagram 600 of a wireless device 605 that supports signaling methods for frequency offset estimation using reference signals in accordance with aspects of the present disclosure. Wireless device 605 may be an example of aspects of a UE 115 or base station 105 as described with reference to FIG. 1. Wireless device 605 may include receiver 610, frequency offset manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to signaling methods for frequency offset estimation using reference signals, etc.). Information may be passed on to other components of the device. The receiver 610 may be an example of aspects of the transceiver 935 as described with reference to FIG. 9.

Frequency offset manager 615 may be an example of aspects of the frequency offset manager 915 as described with reference to FIG. 9. Frequency offset manager 615 and/or at least some of its various sub-components may be implemented in hardware, software executed by a processor, firmware, or any combination thereof. If implemented in software executed by a processor, the functions of the frequency offset manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The frequency offset manager 615 and/or at least some of its various sub-components may be physically located at various positions, including being distributed such that portions of functions are implemented at different physical locations by one or more physical devices. In some examples, frequency offset manager 615 and/or at least some of its various sub-components may be a separate and distinct component in accordance with various aspects of the present disclosure. In other examples, frequency offset manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Frequency offset manager 615 may identify a frequency offset estimation request for a wireless device (e.g., another wireless device, such as a UE 115 or base station 105) in a system that supports mmW communications and transmit, to the wireless device, a first signal identifying parameters for a reference signal to be transmitted for a frequency offset estimation. In some cases, frequency offset manager 615 may transmit the reference signal based on the identified parameters, and receive, from the wireless device, a second signal including a frequency offset estimate sent in response to the transmitted reference signal. Frequency offset manager 615 may also receive, from a wireless device in a system that supports mmW communications, a first signal identifying parameters for a reference signal to be received for a frequency offset estimation, and receive the reference signal based on the identified parameters. Additionally or alternatively, in place of, or in addition to the first signal, frequency offset manager 615 may identify the parameters for the reference signal based on higher layer signaling. In some examples, frequency offset manager 615 may transmit, to the wireless device, a second signal including a frequency offset estimate sent in response to the transmitted reference signal.

Transmitter 620 may transmit signals generated by other components of the device. In some examples, the transmitter 620 may be collocated with a receiver 610 in a transceiver module. For example, the transmitter 620 may be an example of aspects of the transceiver 935 as described with reference to FIG. 9. The transmitter 620 may include a single antenna, or it may include a set of antennas.

Figure 7:
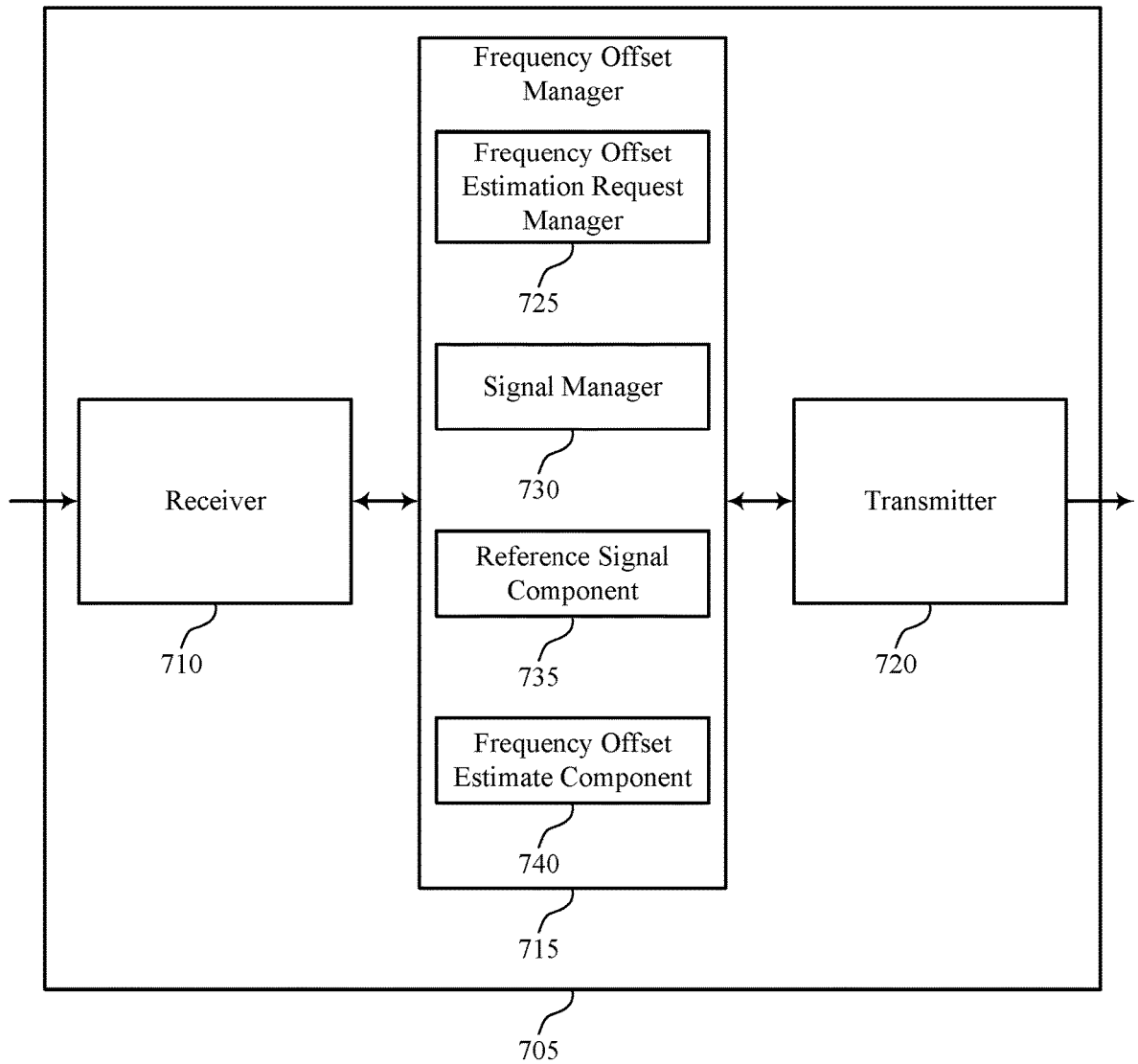

FIG. 7 shows a block diagram 700 of a wireless device 705 that supports signaling methods for frequency offset estimation using reference signals in accordance with aspects of the present disclosure. Wireless device 705 may be an example of aspects of a wireless device 605 or a UE 115 or base station 105 as described with reference to FIGS. 1 and 6. Wireless device 705 may include receiver 710, frequency offset manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to signaling methods for frequency offset estimation using reference signals, etc.). Information may be passed on to other components of the device. The receiver 710 may be an example of aspects of the transceiver 935 as described with reference to FIG. 9.

Frequency offset manager 715 may be an example of aspects of the frequency offset manager 915 as described with reference to FIG. 9. Frequency offset manager 715 and/or at least some of its various sub-components may be implemented in hardware, software executed by a processor, firmware, or any combination thereof. If implemented in software executed by a processor, the functions of the frequency offset manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The frequency offset manager 715 and/or at least some of its various sub-components may be physically located at various positions, including being distributed such that portions of functions are implemented at different physical locations by one or more physical devices. In some examples, frequency offset manager 715 and/or at least some of its various sub-components may be a separate and distinct component in accordance with various aspects of the present disclosure. In other examples, frequency offset manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Frequency offset manager 715 may also include frequency offset estimation request manager 725, signal manager 730, reference signal component 735, and frequency offset estimate component 740.

Frequency offset estimation request manager 725 may identify a frequency offset estimation request for a wireless device (e.g., another UE 115 or base station 105) in a system that supports mmW communications. In some cases, identifying the frequency offset estimation request includes receiving a request from the wireless device. Additionally or alternatively, identifying the frequency offset estimation request includes transmitting, to the wireless device, a request to send a reference signal. In some example, receiving a first signal is based on the transmitted request. In some cases, the request from the wireless device includes an indication of at least one proposed parameter, the at least one proposed parameter including a proposed frequency domain pattern, a proposed time domain pattern, one or more proposed port numbers, a proposed transmission time, a proposed feedback scheme for the frequency offset estimate, or a combination thereof.

Signal manager 730 may transmit, to the wireless device, a first signal identifying parameters for a reference signal to be transmitted for a frequency offset estimation. In some examples, transmitting the first signal includes transmitting an initialization signal including the frequency offset estimation request. Signal manager 730 may also receive, from a wireless device in a system that supports mmW communications, a first signal identifying parameters for a reference signal to be received for a frequency offset estimation. Additionally or alternatively, in place of, or in addition to the first signal, either wireless device in the system may identify the parameters for the reference signal based on higher layer signaling. In some cases, the identified parameters include a frequency domain pattern, a time domain pattern, one or more port numbers, a transmission time, a feedback scheme for the frequency offset estimate, or a combination thereof.

In some cases, the first signal includes an indication of approval of the proposed parameters. In some cases, the first signal includes an indication of an alternative reference signal parameter including an alternative frequency domain pattern, an alternative time domain pattern, one or more alternative port numbers, an alternative transmission time, an alternative feedback scheme for the frequency offset estimate, or a combination thereof. In some examples, the first signal is transmitted using DCI or using RRC signaling. In some cases, the first signal is transmitted (or received) using a CSI-RS report, a control channel, a data channel (e.g., a physical uplink shared channel (PUSCH)), an SRS, or a combination thereof. In some cases, the first signal is transmitted (or received) using DCI or using RRC signaling.

Reference signal component 735 may transmit the reference signal based on the identified parameters and receive the reference signal based on the identified parameters. In some cases, the transmitting the reference signal includes transmitting the reference signal at a predefined time or during a predefined TTI. In some cases, the reference signal includes a PT-RS, a MRS, a SRS, or a combination thereof. In some cases, the receiving the reference signal includes: receiving the reference signal at a predefined time or during a predefined TTI. Frequency offset estimate component 740 may receive, from the wireless device, a second signal including a frequency offset estimate sent in response to the transmitted reference signal and transmit, to the wireless device, a second signal including a frequency offset estimate sent in response to the transmitted reference signal.

Transmitter 720 may transmit signals generated by other components of the device. In some examples, the transmitter 720 may be collocated with a receiver 710 in a transceiver module. For example, the transmitter 720 may be an example of aspects of the transceiver 935 as described with reference to FIG. 9. The transmitter 720 may include a single antenna, or it may include a set of antennas.

Figure 8:
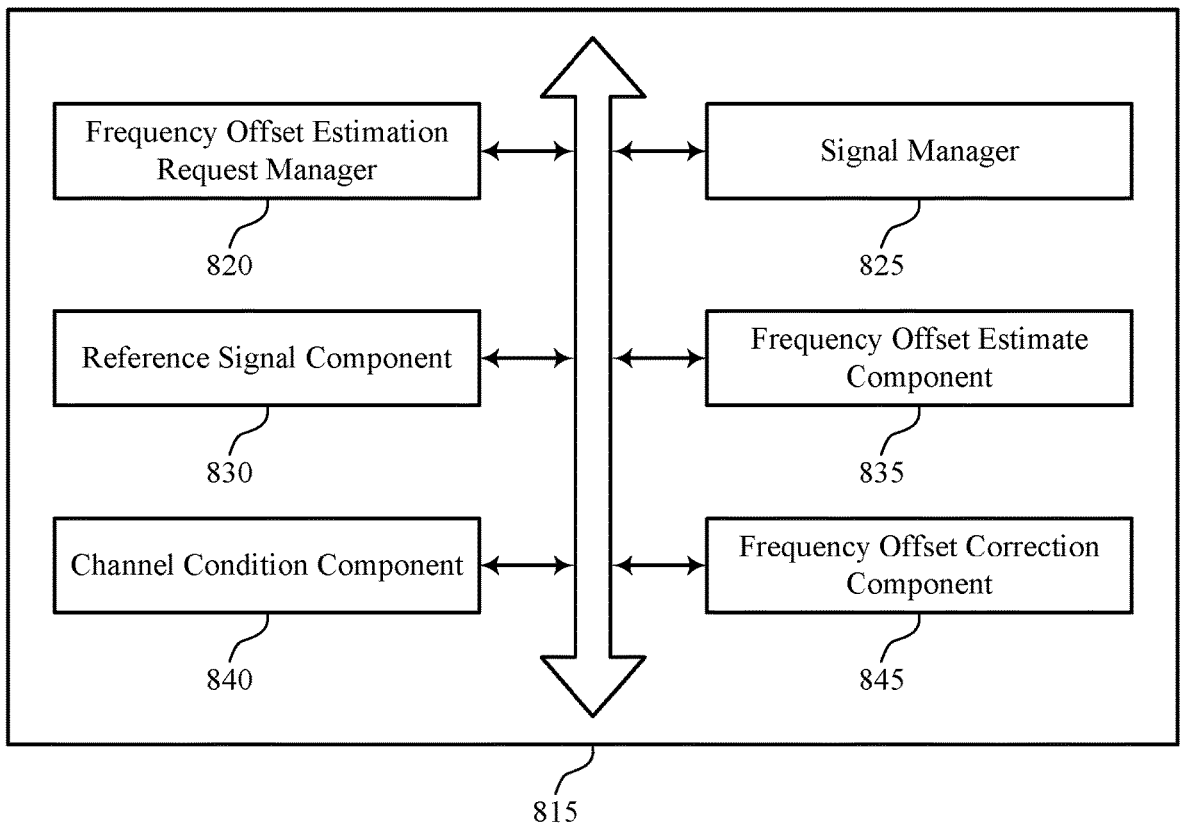
FIG. 8 shows a block diagram of a frequency offset manager that supports signaling methods for frequency offset estimation using reference signals in accordance with aspects of the present disclosure.

FIG. 8 shows a block diagram 800 of a frequency offset manager 815 that supports signaling methods for frequency offset estimation using reference signals in accordance with aspects of the present disclosure. The frequency offset manager 815 may be an example of aspects of a frequency offset manager 615, a frequency offset manager 715, or a frequency offset manager 915 as described with reference to FIGS. 6, 7, and 9.

Frequency offset manager 815 and/or at least some of its various sub-components may be implemented in hardware, software executed by a processor, firmware, or any combination thereof. If implemented in software executed by a processor, the functions of frequency offset manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

Frequency offset manager 815 and/or at least some of its various sub-components may be physically located at various positions, including being distributed such that portions of functions are implemented at different physical locations by one or more physical devices. In some examples, frequency offset manager 815 and/or at least some of its various sub-components may be a separate and distinct component in accordance with various aspects of the present disclosure. In other examples, frequency offset manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Frequency offset manager 815 may include frequency offset estimation request manager 820, signal manager 825, reference signal component 830, frequency offset estimate component 835, channel condition component 840, and frequency offset correction component 845. Each of these modules may communicate, directly or indirectly, with one another (e.g., via one or more buses).

Frequency offset estimation request manager 820 may identify a frequency offset estimation request for a wireless device (e.g., another UE 115 or base station 105) in a system that supports mmW communications. In some cases, identifying the frequency offset estimation request includes receiving a request from the wireless device. Additionally or alternatively, identifying the frequency offset estimation request includes transmitting, to the wireless device, a request to send a reference signal. In some example, receiving a first signal is based on the transmitted request. In some cases, the request from the wireless device includes an indication of at least one proposed parameter, the at least one proposed parameter including a proposed frequency domain pattern, a proposed time domain pattern, one or more proposed port numbers, a proposed transmission time, a proposed feedback scheme for the frequency offset estimate, or a combination thereof. Additionally or alternatively, in place of, or in addition to the first signal, one or both of the wireless devices may identify the parameters for the reference signal based on higher layer signaling.

Signal manager 825 may transmit, to the wireless device, a first signal identifying parameters for a reference signal to be transmitted for a frequency offset estimation. In some examples, transmitting the first signal includes transmitting an initialization signal including the frequency offset estimation request. Signal manager 825 may also receive, from a wireless device in a system that supports mmW communications, a first signal identifying parameters for a reference signal to be received for a frequency offset estimation. In some cases, the identified parameters include a frequency domain pattern, a time domain pattern, one or more port numbers, a transmission time, a feedback scheme for the frequency offset estimate, or a combination thereof.

In some cases, the first signal includes an indication of approval of the proposed parameters. In some cases, the first signal includes an indication of an alternative reference signal parameter including an alternative frequency domain pattern, an alternative time domain pattern, one or more alternative port numbers, an alternative transmission time, an alternative feedback scheme for the frequency offset estimate, or a combination thereof. In some examples, the first signal is transmitted using DCI or using RRC signaling. In some cases, the first signal is transmitted (or received) using a CSI-RS report, a control channel, a data channel, an SRS, or a combination thereof. In some cases, the first signal is transmitted (or received) using DCI or using RRC signaling.

Reference signal component 830 may transmit the reference signal based on the identified parameters and receive the reference signal based on the identified parameters. In some cases, transmitting the reference signal includes transmitting the reference signal at a predefined time or during a predefined TTI. In some cases, the reference signal includes a PT-RS, a MRS, a SRS, or a combination thereof. In some cases, the receiving the reference signal includes: receiving the reference signal at a predefined time or during a predefined TTI. Frequency offset estimate component 835 may receive, from the wireless device, a second signal including a frequency offset estimate sent in response to the transmitted reference signal and transmit, to the wireless device, a second signal including a frequency offset estimate sent in response to the transmitted reference signal.

Channel condition component 840 may identify a Doppler shift associated with the wireless device, or a carrier frequency offset between a transmitted signal and a received signal, or both, where the frequency offset estimate is based on the identified Doppler shift, or the identified carrier frequency offset between the transmitted signal and the received signal, or both. Frequency offset correction component 845 may transmit a signal using an adjusted frequency based on the frequency offset estimate, transmit a signal using an adjusted frequency based on the recommended frequency adjustment, and transmit a signal indicating a recommended frequency adjustment based on the frequency offset estimate.

Figure 9:
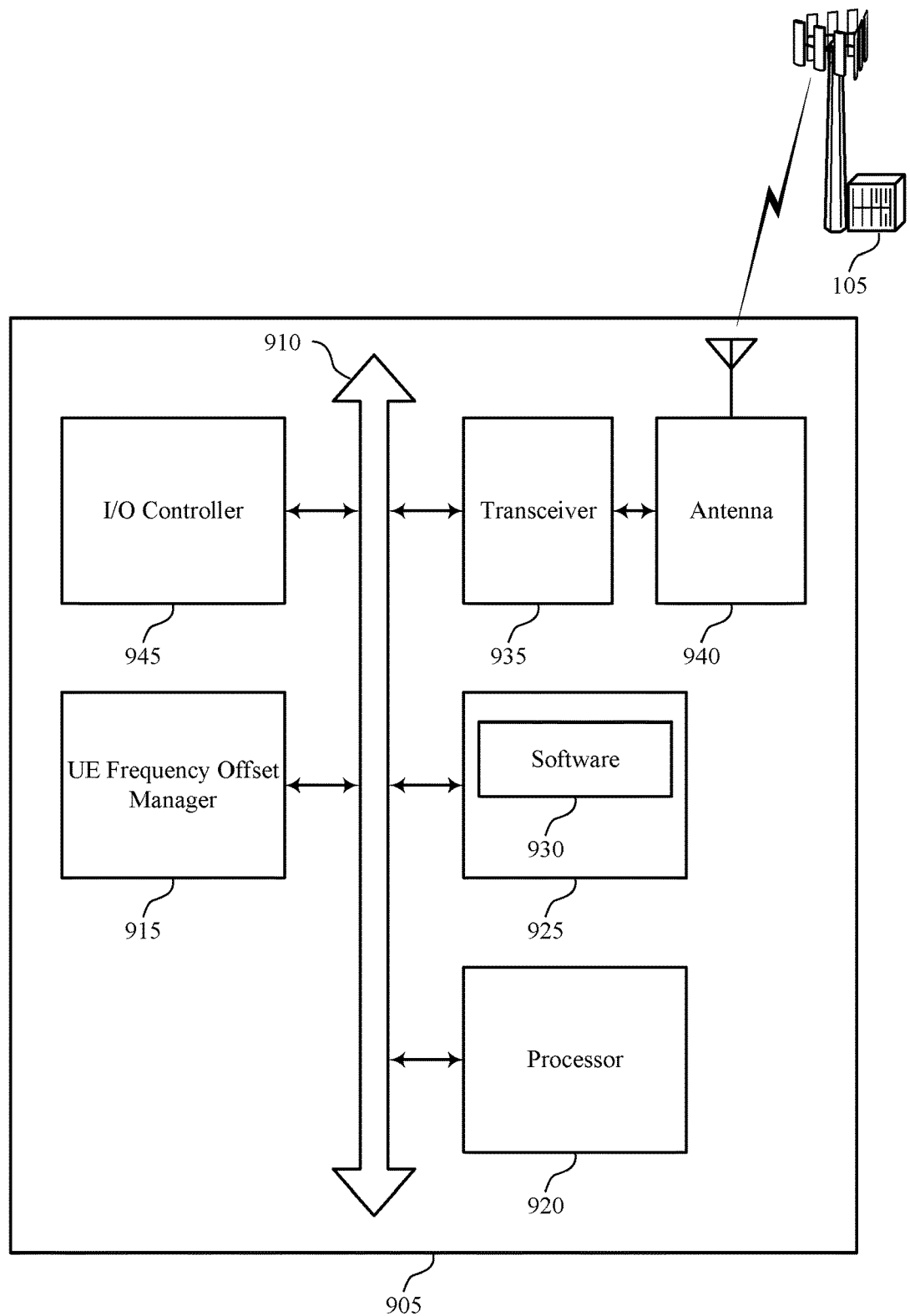
FIG. 9 illustrates a block diagram of a system including a wireless device that supports signaling methods for frequency offset estimation using reference signals in accordance with aspects of the present disclosure.

FIG. 9 shows a block diagram of a system 900 including a wireless device 905 that supports signaling methods for frequency offset estimation using reference signals in accordance with aspects of the present disclosure. Wireless device 905 may be an example of or include the components of wireless device 605, wireless device 705, a base station 105, or a UE 115 as described, e.g., with reference to FIGS. 1, 2, 6 and 7. Wireless device 905 may include components for bi-directional voice and data communications including components for transmitting and receiving communications, including frequency offset manager 915, processor 920, memory 925, software 930, transceiver 935, antenna 940, and I/O controller 945. These components may be in electronic communication via one or more busses (e.g., bus 910). Wireless device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting signaling methods for frequency offset estimation using reference signals).

Memory 925 may include random access memory (RAM) and read only memory (ROM). Memory 925 may store computer-readable, computer-executable software 930 including instructions that, when executed, cause the processor to perform various functions described herein. In some cases, memory 925 may contain, among other things, a basic input/output system (BIOS) which may control basic hardware and/or software operation such as the interaction with peripheral components or devices.

Software 930 may include code to implement aspects of the present disclosure, including code to support signaling methods for frequency offset estimation using reference signals. Software 930 may be stored in a non-transitory computer-readable medium such as system memory or other memory. In some cases, software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. Transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for wireless device 905. I/O controller 945 may also manage peripherals not integrated into wireless device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with wireless device 905 via I/O controller 945 or via hardware components controlled by I/O controller 945.

Figure 10:
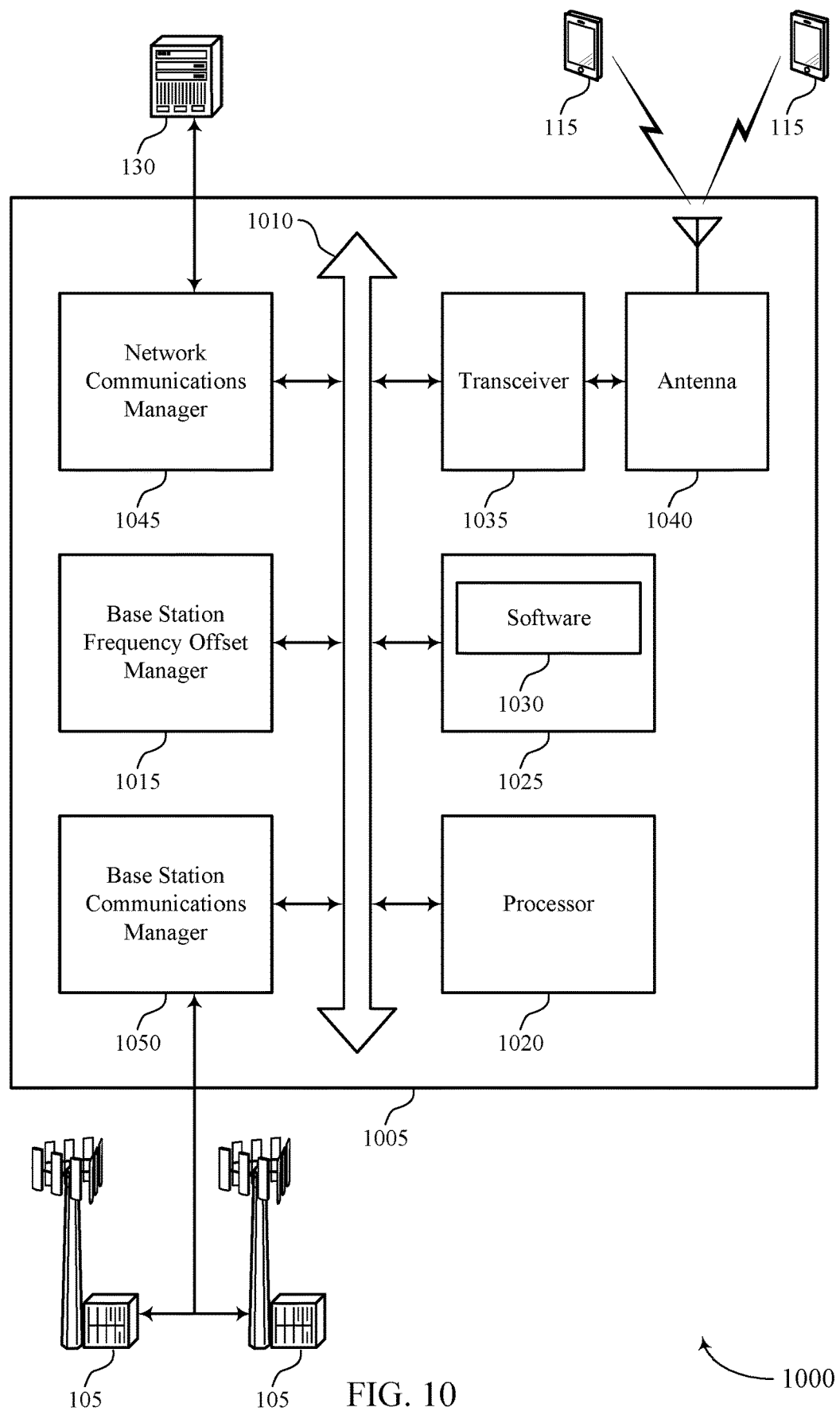
FIG. 10 illustrates a block diagram of a system including a wireless device that supports signaling methods for frequency offset estimation using reference signals in accordance with aspects of the present disclosure.

FIG. 10 shows a block diagram of a system 1000 including a wireless device 1005 that supports signaling methods for frequency offset estimation using reference signals in accordance with aspects of the present disclosure. Wireless device 1005 may be an example of or include the components of wireless device 705, wireless device 805, or a base station 105 as described, e.g., with reference to FIGS. 1, 2, 7 and 8. Wireless device 1005 may include components for bi-directional voice and data communications including components for transmitting and receiving communications, including base station frequency offset manager 1015, processor 1020, memory 1025, software 1030, transceiver 1035, antenna 1040, network communications manager 1045, and base station communications manager 1050. These components may be in electronic communication via one or more busses (e.g., bus 1010). Wireless device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting signaling methods for frequency offset estimation using reference signals).

Memory 1025 may include RAM and ROM. Memory 1025 may store computer-readable, computer-executable software 1030 including instructions that, when executed, cause the processor to perform various functions described herein. In some cases, memory 1025 may contain, among other things, a BIOS which may control basic hardware and/or software operation such as the interaction with peripheral components or devices.

Software 1030 may include code to implement aspects of the present disclosure, including code to support signaling methods for frequency offset estimation using reference signals. Software 1030 may be stored in a non-transitory computer-readable medium such as system memory or other memory. In some cases, software 1030 may not be directly executable by the processor but may cause a computer (e.g., when compiled and executed) to perform functions described herein.

Transceiver 1035 may communicate bi-directionally, via one or more antennas, wired, or wireless links as described above. For example, transceiver 1035 may represent a wireless transceiver and may communicate bi-directionally with another wireless transceiver. Transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, network communications manager 1045 may manage the transfer of data communications for client devices, such as one or more UEs 115. Base station communications manager 1050 may manage communications with other base station 105, and may include a controller or scheduler for controlling communications with UEs 115 in cooperation with other base stations 105. For example, base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
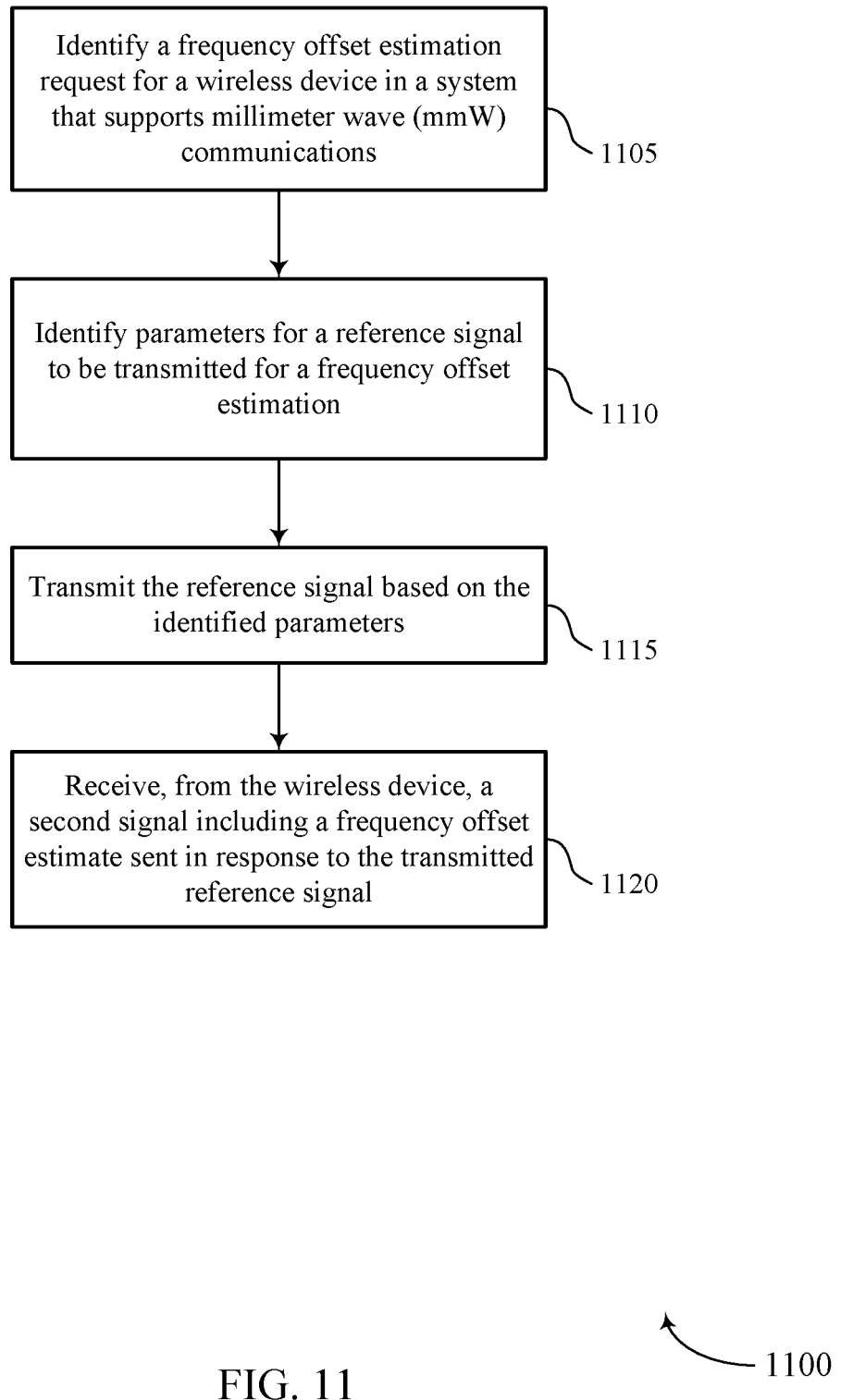
FIGS. 11 through 16 show flowcharts illustrating methods for signaling methods for frequency offset estimation using reference signals in accordance with aspects of the present disclosure.

FIG. 11 shows a flowchart illustrating a method 1100 for signaling methods for frequency offset estimation using reference signals in accordance with aspects of the present disclosure. The operations of method 1100 may be implemented by a UE 115 or base station 105 or its components as described herein. For example, the operations of method 1100 may be performed by a frequency offset manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may identify a frequency offset estimation request for a wireless device (e.g., another base station 105 or another UE 115) in a system that supports mmW communications. For instance, a UE 115 may identify a scenario where a frequency offset estimation may be performed by a base station 105. Additionally or alternatively, a base station 105 may identify a frequency offset estimation request for a UE 115 (such as when the UE 115 is mobile, and communications are affected by Doppler shift). The operations of block 1105 may be performed according to the methods as described with reference to FIGS. 1 through 5. In certain examples, aspects of the operations of block 1105 may be performed by a frequency offset estimation request manager as described with reference to FIGS. 6 through 8.

At block 1110 the UE 115 or base station 105 may identify parameters for a reference signal to be transmitted for a frequency offset estimation. In some cases, the UE 115 or base station 105 may transmit, to the wireless device, an initialization signal (e.g., a first signal) including the frequency offset estimation request. In some cases, the initialization signal may include a frequency domain pattern, a time domain pattern, one or more port numbers, a transmission time, a feedback scheme for the frequency offset estimate, or a combination thereof. The operations of block 1110 may be performed according to the methods as described with reference to FIGS. 1 through 5. In certain examples, aspects of the operations of block 1110 may be performed by a signal manager as described with reference to FIGS. 6 through 8.

At block 1115 the UE 115 or base station 105 may transmit the reference signal based at least in part on the identified parameters. The operations of block 1115 may be performed according to the methods as described with reference to FIGS. 1 through 5. In certain examples, aspects of the operations of block 1115 may be performed by a reference signal component as described with reference to FIGS. 6 through 8.

At block 1120 the UE 115 or base station 105 may receive, from the wireless device, a second signal comprising a frequency offset estimate sent in response to the transmitted reference signal. The operations of block 1120 may be performed according to the methods as described with reference to FIGS. 1 through 5. In certain examples, aspects of the operations of block 1120 may be performed by a frequency offset estimate component as described with reference to FIGS. 6 through 8.

Figure 12:
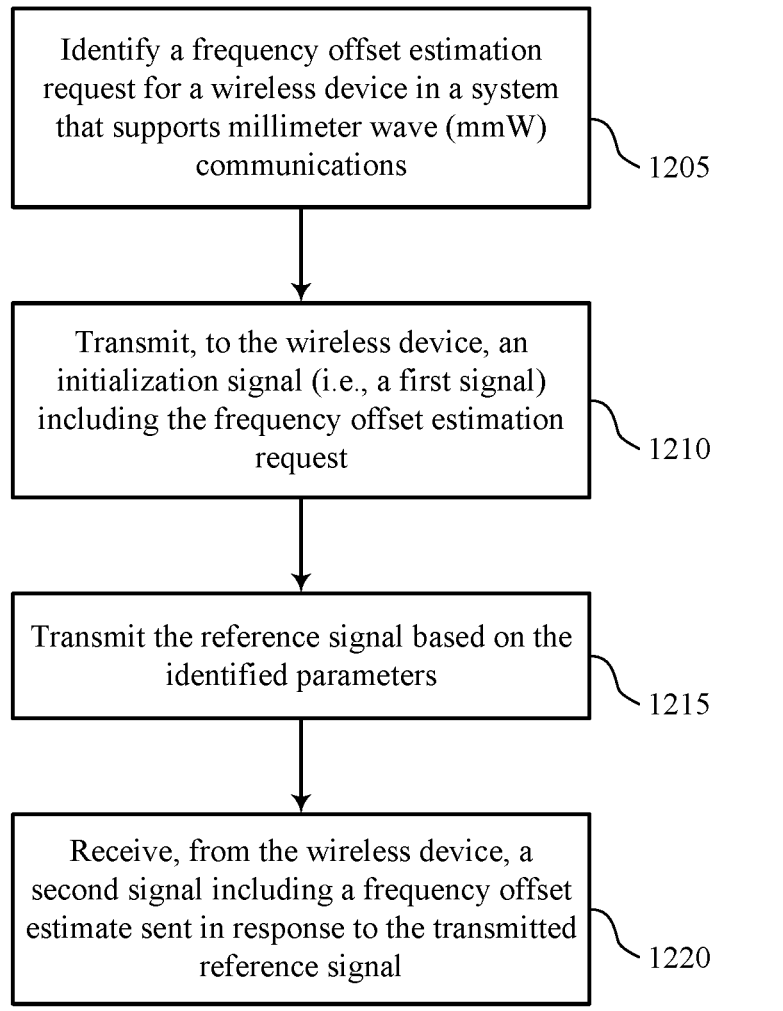

FIG. 12 shows a flowchart illustrating a method 1200 for signaling methods for frequency offset estimation using reference signals in accordance with aspects of the present disclosure. The operations of method 1200 may be implemented by a UE 115 or base station 105 or its components as described herein. For example, the operations of method 1200 may be performed by a frequency offset manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may identify a frequency offset estimation request for a wireless device in a system that supports mmW communications. For instance, a UE 115 may identify a scenario where a frequency offset estimation may be performed by a base station 105. Additionally or alternatively, a base station 105 may identify a frequency offset estimation request for a UE 115 (such as when the UE 115 is mobile, and communications are affected by Doppler shift). The operations of block 1205 may be performed according to the methods as described with reference to FIGS. 1 through 5. In certain examples, aspects of the operations of block 1205 may be performed by a frequency offset estimation request manager as described with reference to FIGS. 6 through 8.

At block 1210 the UE 115 or base station 105 may transmit, to the wireless device, an initialization signal (i.e., a first signal) including the frequency offset estimation request. In some cases, the initialization signal may include a frequency domain pattern, a time domain pattern, one or more port numbers, a transmission time, a feedback scheme for the frequency offset estimate, or a combination thereof. The operations of block 1210 may be performed according to the methods as described with reference to FIGS. 1 through 5. In certain examples, aspects of the operations of block 1210 may be performed by a signal manager as described with reference to FIGS. 6 through 8.

At block 1215 the UE 115 or base station 105 may transmit the reference signal based at least in part on the identified parameters. The operations of block 1215 may be performed according to the methods as described with reference to FIGS. 1 through 5. In certain examples, aspects of the operations of block 1215 may be performed by a reference signal component as described with reference to FIGS. 6 through 8.

At block 1220 the UE 115 or base station 105 may receive, from the wireless device, a second signal comprising a frequency offset estimate sent in response to the transmitted reference signal. The operations of block 1220 may be performed according to the methods described with reference to FIGS. 1 through 5. In certain examples, aspects of the operations of block 1220 may be performed by a frequency offset estimate component as described with reference to FIGS. 6 through 8.

Figure 13:
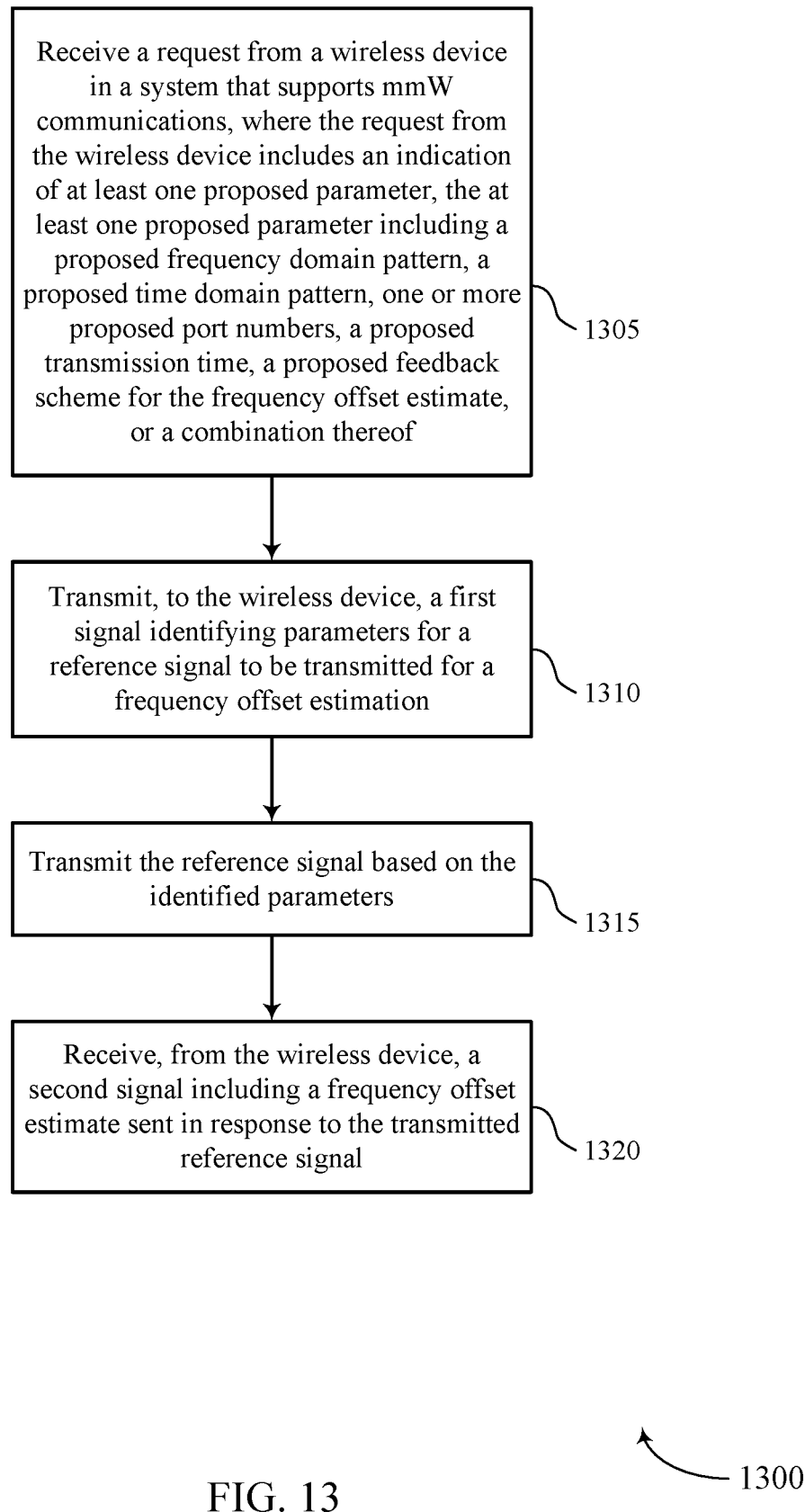

FIG. 13 shows a flowchart illustrating a method 1300 for signaling methods for frequency offset estimation using reference signals in accordance with aspects of the present disclosure. The operations of method 1300 may be implemented by a UE 115 or base station 105 or its components as described herein. For example, the operations of method 1300 may be performed by a frequency offset manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive a request from a wireless device in a system that supports mmW communications. The request may include, for example, an indication of at least one proposed parameter, the at least one proposed parameter comprising a proposed frequency domain pattern, a proposed time domain pattern, one or more proposed port numbers, a proposed transmission time, a proposed feedback scheme for the frequency offset estimate, or a combination thereof. The operations of block 1305 may be performed according to the methods as described with reference to FIGS. 1 through 5. In certain examples, aspects of the operations of block 1305 may be performed by a frequency offset estimation request manager as described with reference to FIGS. 6 through 8.

At block 1310 the UE 115 or base station 105 may transmit, to the wireless device, a first signal identifying parameters for a reference signal to be transmitted for a frequency offset estimation. In some cases, the first signal may include an indication of approval of the proposed parameters. Additionally or alternatively, the first signal may include an indication of an alternative reference signal parameter including an alternative frequency domain pattern, an alternative time domain pattern, one or more alternative port numbers, an alternative transmission time, an alternative feedback scheme for the frequency offset estimate, or a combination thereof. The operations of block 1310 may be performed according to the methods as described with reference to FIGS. 1 through 5. In certain examples, aspects of the operations of block 1310 may be performed by a signal manager as described with reference to FIGS. 6 through 8.

At block 1315 the UE 115 or base station 105 may transmit the reference signal based at least in part on the identified parameters. That is, the UE 115 or base station 105 may transmit the reference signal according to the proposed reference signal parameter(s), or according to the alternative reference signal parameter(s). The operations of block 1315 may be performed according to the methods described with reference to FIGS. 1 through 5. In certain examples, aspects of the operations of block 1315 may be performed by a reference signal component as described with reference to FIGS. 6 through 8.

At block 1320 the UE 115 or base station 105 may receive, from the wireless device, a second signal comprising a frequency offset estimate sent in response to the transmitted reference signal. The operations of block 1320 may be performed according to the methods as described with reference to FIGS. 1 through 5. In certain examples, aspects of the operations of block 1320 may be performed by a frequency offset estimate component as described with reference to FIGS. 6 through 8.

Figure 14:
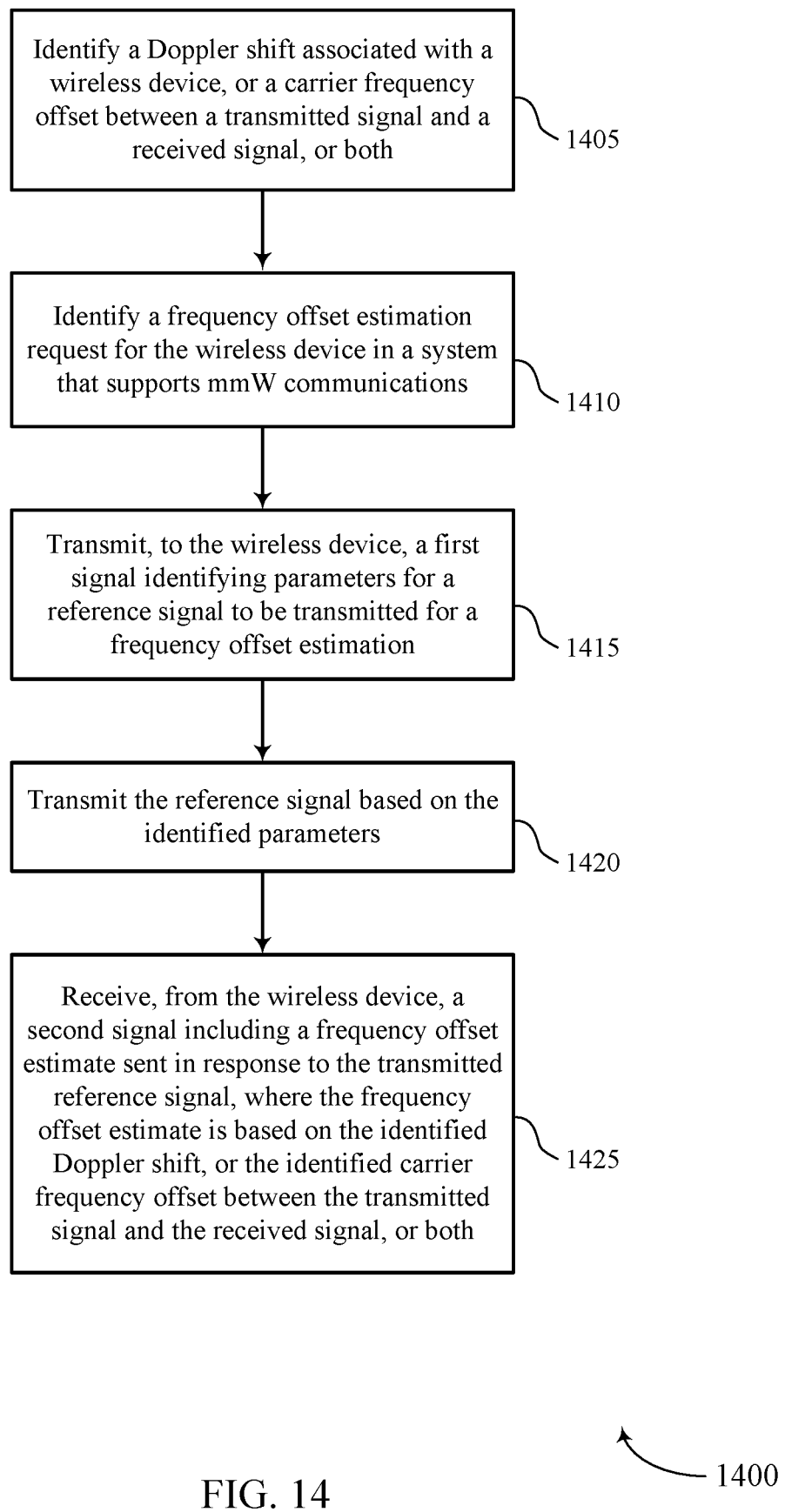

FIG. 14 shows a flowchart illustrating a method 1400 for signaling methods for frequency offset estimation using reference signals in accordance with aspects of the present disclosure. The operations of method 1400 may be implemented by a UE 115 or base station 105 or its components as described herein. For example, the operations of method 1400 may be performed by a frequency offset manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify a Doppler shift associated with the wireless device, or a carrier frequency offset between a transmitted signal and a received signal, or both. The operations of block 1405 may be performed according to the methods as described with reference to FIGS. 1 through 5. In certain examples, aspects of the operations of block 1405 may be performed by a channel condition component as described with reference to FIGS. 6 through 8.

At block 1410 the UE 115 or base station 105 may identify a frequency offset estimation request for a wireless device in a system that supports mmW communications. The operations of block 1410 may be performed according to the methods as described with reference to FIGS. 1 through 5. In certain examples, aspects of the operations of block 1410 may be performed by a frequency offset estimation request manager as described with reference to FIGS. 6 through 8.

At block 1415 the UE 115 or base station 105 may transmit, to the wireless device, a first signal identifying parameters for a reference signal to be transmitted for a frequency offset estimation. The operations of block 1415 may be performed according to the methods described with reference to FIGS. 1 through 5. In certain examples, aspects of the operations of block 1415 may be performed by a signal manager as described with reference to FIGS. 6 through 8.

At block 1420 the UE 115 or base station 105 may transmit the reference signal based at least in part on the identified parameters. The operations of block 1420 may be performed according to the methods as described with reference to FIGS. 1 through 5. In certain examples, aspects of the operations of block 1420 may be performed by a reference signal component as described with reference to FIGS. 6 through 8.

At block 1425 the UE 115 or base station 105 may receive, from the wireless device, a second signal comprising a frequency offset estimate sent in response to the transmitted reference signal, where the frequency offset estimate is based at least in part on the identified Doppler shift, or the identified carrier frequency offset between the transmitted signal and the received signal, or both. The operations of block 1425 may be performed according to the methods as described with reference to FIGS. 1 through 5. In certain examples, aspects of the operations of block 1425 may be performed by a frequency offset estimate component as described with reference to FIGS. 6 through 8.

Figure 15:
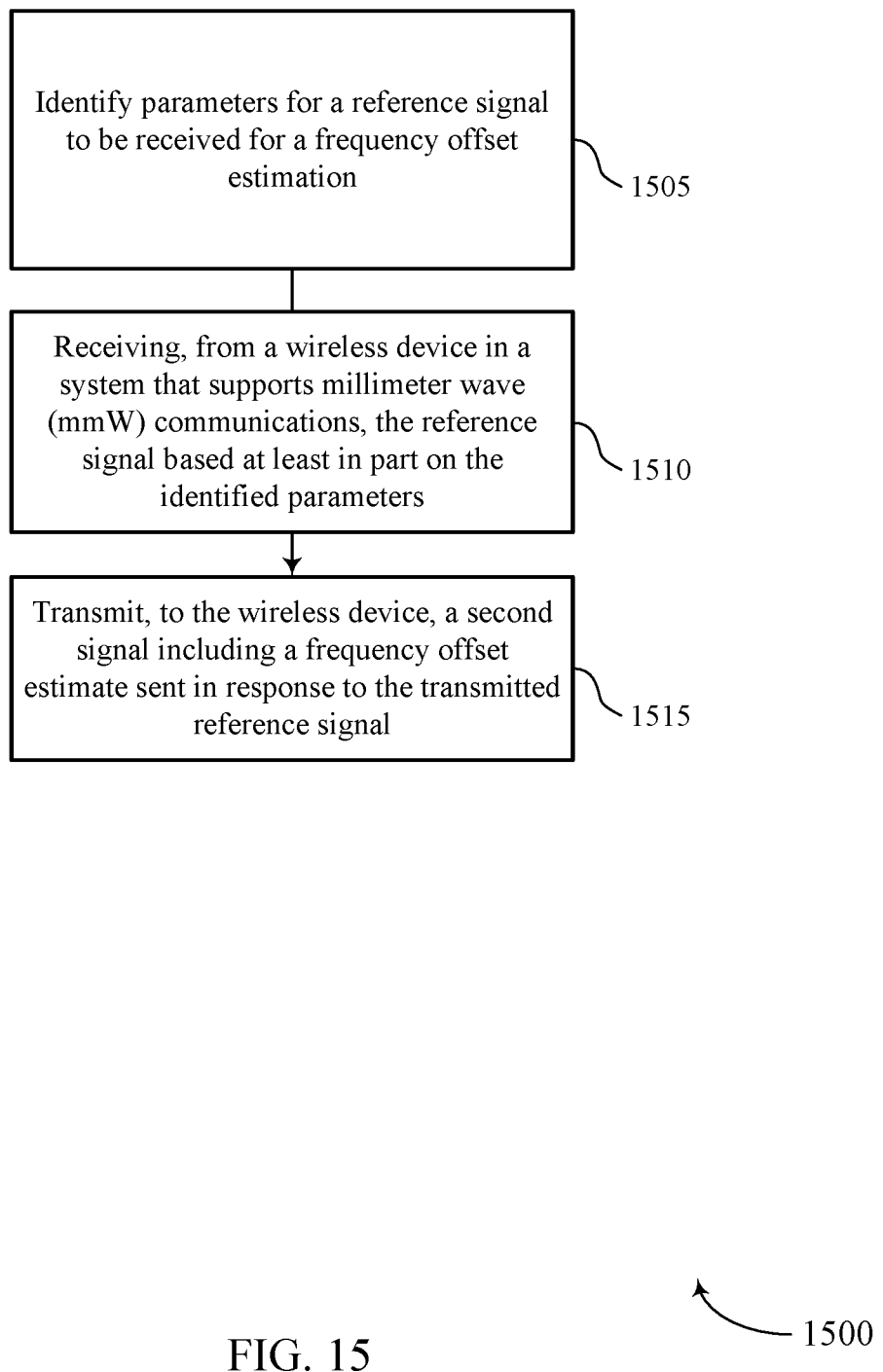

FIG. 15 shows a flowchart illustrating a method 1500 for signaling methods for frequency offset estimation using reference signals in accordance with aspects of the present disclosure. The operations of method 1500 may be implemented by a UE 115 or base station 105 or its components as described herein. For example, the operations of method 1500 may be performed by a frequency offset manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify parameters for a reference signal to be received for a frequency offset estimation. In some cases, identifying the parameters may be based on receiving, from a wireless device in a system that supports mmW communications, a first signal identifying parameters for the reference signal to be received for a frequency offset estimation. The operations of block 1505 may be performed according to the methods as described with reference to FIGS. 1 through 5. In certain examples, aspects of the operations of block 1505 may be performed by a signal manager as described with reference to FIGS. 6 through 8.

At block 1510 the UE 115 or base station 105 may receive, from a wireless device in a system that supports mmW communications, the reference signal based at least in part on the identified parameters. The operations of block 1510 may be performed according to the methods described with reference to FIGS. 1 through 5. In certain examples, aspects of the operations of block 1510 may be performed by a reference signal component as described with reference to FIGS. 6 through 8.

At block 1515 the UE 115 or base station 105 may transmit, to the wireless device, a second signal comprising a frequency offset estimate sent in response to the transmitted reference signal. The operations of block 1515 may be performed according to the methods as described with reference to FIGS. 1 through 5. In certain examples, aspects of the operations of block 1515 may be performed by a frequency offset estimate component as described with reference to FIGS. 6 through 8.

Figure 16:
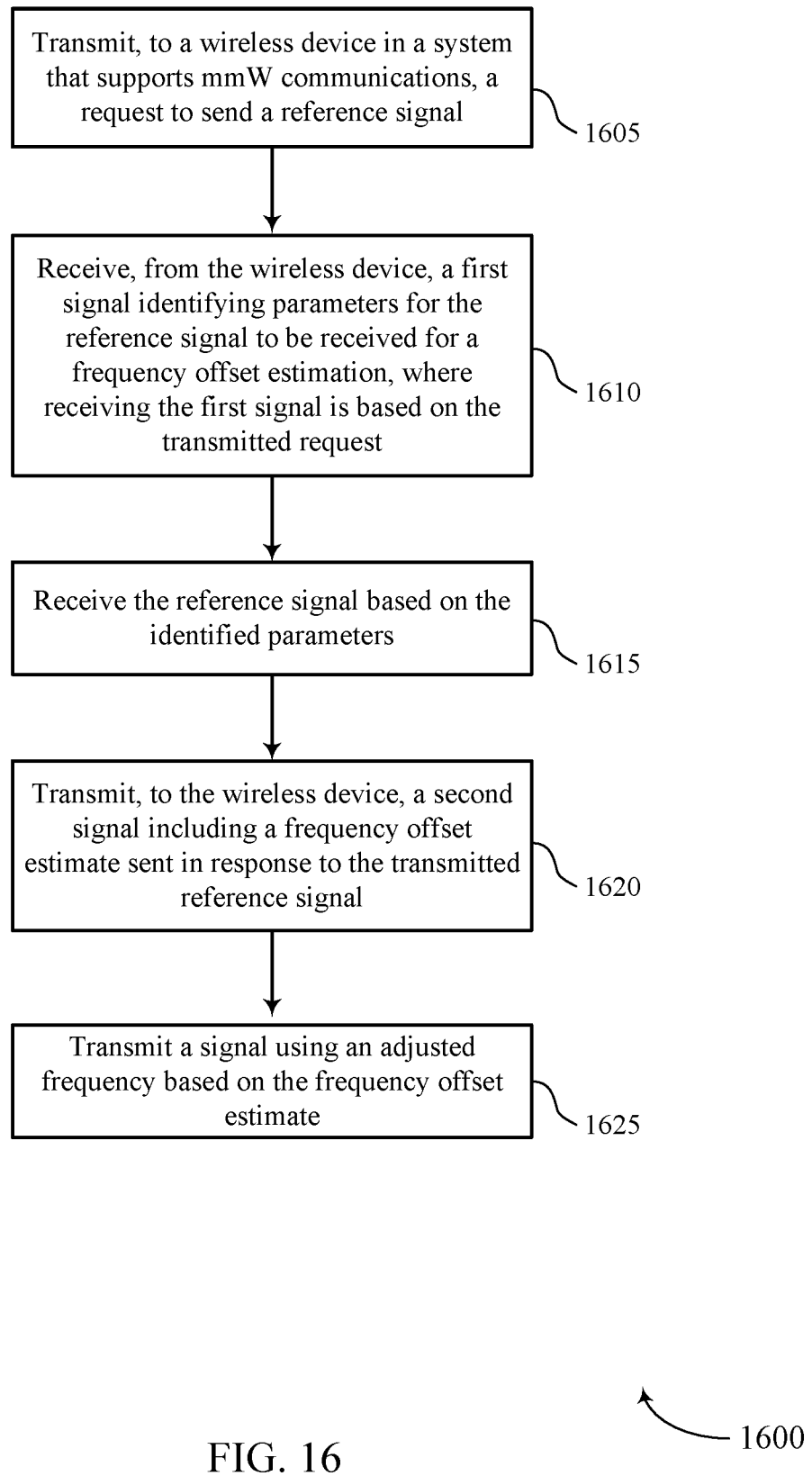

FIG. 16 shows a flowchart illustrating a method 1600 for signaling methods for frequency offset estimation using reference signals in accordance with aspects of the present disclosure. The operations of method 1600 may be implemented by a UE 115 or base station 105 or its components as described herein. For example, the operations of method 1600 may be performed by a frequency offset manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1625 the UE 115 or base station 105 may transmit, to a wireless device in a system that supports mmW communications, a request to send a reference signal. The operations of block 1625 may be performed according to the methods as described with reference to FIGS. 1 through 5. In certain examples, aspects of the operations of block 1625 may be performed by a frequency offset estimation request manager as described with reference to FIGS. 6 through 8.

At block 1610 the UE 115 or base station 105 may receive, from the wireless device, a first signal identifying parameters for the reference signal to be received for a frequency offset estimation, where receiving the first signal is based on the transmitted request. The operations of block 1610 may be performed according to the methods as described with reference to FIGS. 1 through 5. In certain examples, aspects of the operations of block 1610 may be performed by a signal manager as described with reference to FIGS. 6 through 8.

At block 1615 the UE 115 or base station 105 may receive the reference signal based at least in part on the identified parameters. The operations of block 1615 may be performed according to the methods as described with reference to FIGS. 1 through 5. In certain examples, aspects of the operations of block 1615 may be performed by a reference signal component as described with reference to FIGS. 6 through 8.

At block 1620 the UE 115 or base station 105 may transmit, to the wireless device, a second signal comprising a frequency offset estimate sent in response to the transmitted reference signal. The operations of block 1620 may be performed according to the methods as described with reference to FIGS. 1 through 5. In certain examples, aspects of the operations of block 1620 may be performed by a frequency offset estimate component as described with reference to FIGS. 6 through 8.

At block 1625 the UE 115 or base station 105 may transmit a signal using an adjusted frequency based at least in part on the frequency offset estimate. The operations of block 1625 may be performed according to the methods as described with reference to FIGS. 1 through 5. In certain examples, aspects of the operations of block 1625 may be performed by a frequency offset correction component as described with reference to FIGS. 6 through 8.

In some examples, aspects from two or more of the described methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B, or eNodeB, may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a frequency offset estimation request for a wireless device in a system that supports millimeter wave (mmW) communications, the frequency offset estimation request comprising a request that a reference signal be communicated in a subsequent transmission for a frequency offset estimation;
   identifying parameters for the reference signal to be communicated between a base station in the system and the wireless device for the frequency offset estimation, wherein the parameters indicate two or more port numbers corresponding to two or more ports for transmitting the reference signal, the two or more ports selected from a group of ports based at least in part on a carrier frequency offset or a Doppler shift associated with the selected two or more ports;
   transmitting the reference signal based at least in part on the identified parameters using the two or more ports corresponding to the indicated two or more port numbers; and
   receiving, at the base station from the wireless device, a second signal comprising a frequency offset estimate sent in response to the transmitted reference signal.

2. The method of claim 1, further comprising transmitting an initialization signal including the frequency offset estimation request.

3. The method of claim 1, wherein the identified parameters comprise a frequency domain pattern, a time domain pattern, a transmission time, a feedback scheme for the frequency offset estimate, or a combination thereof.

4. The method of claim 1, wherein identifying the frequency offset estimation request comprises receiving a request from the wireless device.

5. The method of claim 4, wherein the request from the wireless device comprises an indication of at least one proposed parameter, the at least one proposed parameter comprising a proposed frequency domain pattern, a proposed time domain pattern, one or more proposed port numbers, a proposed transmission time, a proposed feedback scheme for the frequency offset estimate, or a combination thereof.

6. The method of claim 5, further comprising transmitting an indication of approval of the at least one proposed parameter.

7. The method of claim 4, further comprising transmitting a first signal, the first signal identifying the parameters for the reference signal, wherein the first signal comprises an indication of an alternative reference signal parameter including an alternative frequency domain pattern, an alternative time domain pattern, one or more alternative port numbers, an alternative transmission time, an alternative feedback scheme for the frequency offset estimate, or a combination thereof.

8. The method of claim 1, wherein the transmitting the reference signal comprises transmitting the reference signal at a predefined time or during a predefined transmission time interval (TTI).

9. The method of claim 1, further comprising identifying the Doppler shift or the carrier frequency offset, the Doppler shift being associated with the wireless device, and the carrier frequency offset being between a transmitted signal and a received signal, or both, wherein the frequency offset estimate is based at least in part on the identified Doppler shift, or the identified carrier frequency offset between the transmitted signal and the received signal, or both.

10. The method of claim 1, further comprising transmitting a signal using an adjusted frequency based at least in part on the frequency offset estimate.

11. The method of claim 1, further comprising transmitting a signal using an adjusted frequency based at least in part on a recommended frequency adjustment.

12. The method of claim 1, further comprising transmitting a first signal, the first signal identifying the parameters for the reference signal, wherein the first signal is transmitted using downlink control information (DCI) or using radio resource control (RRC) signaling.

13. The method of claim 1, further comprising transmitting a first signal, the first signal identifying the parameters for the reference signal, wherein the first signal is transmitted using a channel state information reference signal (CSI-RS) report, a control channel, a data channel, a sounding reference signal (SRS), or a combination thereof.

14. The method of claim 1, wherein the reference signal comprises a phase tracking reference signal (PT-RS), a mobility reference signal (MRS), a sounding reference signal (SRS), or a combination thereof.

15. The method of claim 1, wherein the frequency offset estimation request is identified based at least in part on higher layer signaling.

16. The method of claim 1, wherein the wireless device comprises a user equipment (UE).

17. The method of claim 1, further comprising identifying the Doppler shift, the Doppler shift being associated with the wireless device, wherein identifying the parameters that indicate two or more port numbers corresponding to two or more ports for transmitting the reference signal is based at least in part on the Doppler shift associated with the wireless device.

18. A method for wireless communication, comprising:
identifying a frequency offset estimation request in a system that supports millimeter wave (mmW) communications, the frequency offset estimation request comprising a request that a reference signal be communicated in a subsequent transmission for a frequency offset estimation;
identifying parameters for the reference signal to be communicated between a base station in the system and the wireless device in the system for the frequency offset estimation, wherein the parameters indicate two or more port numbers corresponding to two or more ports for receiving the reference signal, the two or more ports selected from a group of ports based at least in part on a carrier frequency offset or a Doppler shift associated with the selected two or more ports;
receiving the reference signal based at least in part on the identified parameters using the two or more ports corresponding to the indicated two or more port numbers; and
transmitting, from the base station to the wireless device, a second signal comprising a frequency offset estimate sent in response to the transmitted reference signal.

19. The method of claim 18, further comprising:
transmitting, to the wireless device, the frequency offset estimation request comprising the request that the reference signal be communicated; and
receiving a first signal based at least in part on the request that the reference signal be communicated, wherein identifying the parameters for the reference signal is based at least in part on the first signal.

20. The method of claim 19, wherein the request that the reference signal be communicated comprises an indication of at least one proposed parameter, the at least one proposed parameter comprising a proposed frequency domain pattern, a proposed time domain pattern, one or more proposed port numbers, a proposed transmission time, a proposed feedback scheme for the frequency offset estimate, or a combination thereof.

21. The method of claim 18, further comprising identifying the Doppler shift or the carrier frequency offset, the Doppler shift being associated with the wireless device, and the carrier frequency offset being between a transmitted signal and a received signal, or both, wherein the frequency offset estimate is based at least in part on the identified Doppler shift, or the identified carrier frequency offset between the transmitted signal and the received signal, or both.

22. The method of claim 18, further comprising transmitting a signal using an adjusted frequency based at least in part on the frequency offset estimate.

23. The method of claim 18, further comprising transmitting a signal indicating a recommended frequency adjustment based at least in part on the frequency offset estimate.

24. The method of claim 18, wherein the receiving the reference signal comprises receiving the reference signal at a predefined time or during a predefined transmission time interval (TTI).

25. The method of claim 18, further comprising receiving a first signal, the first signal identifying the parameters for the reference signal, wherein the first signal is received using downlink control information (DCI) or using radio resource control (RRC) signaling.

26. The method of claim 18, further comprising transmitting a first signal, the first signal identifying the parameters for the reference signal, wherein the first signal is received using a channel state information reference signal (CSI-RS) report, a control channel, a data channel, a sounding reference signal (SRS), or a combination thereof.

27. The method of claim 18, wherein the reference signal comprises a phase tracking reference signal (PT-RS), a mobility reference signal (MRS), a sounding reference signal (SRS), or a combination thereof.

28. The method of claim 18, further comprising identifying the frequency offset estimation request based at least in part on higher layer signaling.

29. An apparatus for wireless communication, in a system comprising:
a processor;
memory in electronic communication with the processor; and
instructions stored in the memory and executable by the processor to cause the apparatus to:
identify a frequency offset estimation request for a wireless device in a system that supports millimeter wave (mmW) communications, the frequency offset estimation request comprising a request that a reference signal be communicated in a subsequent transmission for a frequency offset estimation;
identify parameters for the reference signal to be communicated between a base station in the system and the wireless device for the frequency offset estimation, wherein the parameters indicate two or more port numbers corresponding to two or more ports for transmitting the reference signal, the two or more ports selected from a group of ports based at least in part on a carrier frequency offset or a Doppler shift associated with the selected two or more ports;
transmit the reference signal based at least in part on the identified parameters using the two or more ports corresponding to the indicated two or more port numbers; and
receive, at the base station from the wireless device, a second signal comprising a frequency offset estimate sent in response to the transmitted reference signal.

30. An apparatus for wireless communication, in a system comprising:
a processor;
memory in electronic communication with the processor; and
instructions stored in the memory and executable by the processor to cause the apparatus to:
identify a frequency offset estimation request in a system that supports millimeter wave (mmW) communications, the frequency offset estimation request comprising a request that a reference signal be communicated in a subsequent transmission for a frequency offset estimation;
identify parameters for the reference signal to be communicated between a base station in the system and the wireless device in the system for the frequency offset estimation, wherein the parameters indicate two or more port numbers corresponding to two or more ports for receiving the reference signal, the two or more ports selected from a group of ports based at least in part on a carrier frequency offset or a Doppler shift associated with the selected two or more ports;
receive the reference signal based at least in part on the identified parameters using the two or more ports corresponding to the indicated two or more port numbers; and transmit, from the base station to the wireless device, a second signal comprising a frequency offset estimate sent in response to the transmitted reference signal.

* * * * *